United States Patent
Workman, Jr. et al.

(10) Patent No.: US 10,215,635 B2
(45) Date of Patent: Feb. 26, 2019

(54) DATA BLENDING MULTIPLE DISPERSIVE RANGE MONOCHROMATOR

(71) Applicant: WESTCO SCIENTIFIC INSTRUMENTS, INC, Brookfield, CT (US)

(72) Inventors: Jerome J. Workman, Jr., Danbury, CT (US); Tushar Saraf, Brookfield, CT (US); Thomas Andrew Bennett, New Milford, CT (US); John Glaberson, N Sandy Hook, CT (US)

(73) Assignee: WESTCO SCIENTIFIC INSTRUMENTS, INC, Brookfield, CT (US)

( * ) Notice: Subject to any disclaimer, the term of this patent is extended or adjusted under 35 U.S.C. 154(b) by 44 days.

(21) Appl. No.: 15/416,552

(22) Filed: Jan. 26, 2017

(65) Prior Publication Data

US 2018/0209849 A1    Jul. 26, 2018

(51) Int. Cl.
*G01J 3/28* (2006.01)
*G01J 3/02* (2006.01)
*G01J 3/06* (2006.01)
*G01J 3/18* (2006.01)

(52) U.S. Cl.
CPC ............ *G01J 3/28* (2013.01); *G01J 3/0202* (2013.01); *G01J 3/0235* (2013.01); *G01J 3/0267* (2013.01); *G01J 3/0289* (2013.01); *G01J 3/06* (2013.01); *G01J 3/1804* (2013.01); *G01J 2003/1828* (2013.01)

(58) Field of Classification Search
None
See application file for complete search history.

(56) References Cited

U.S. PATENT DOCUMENTS

| | | | | |
|---|---|---|---|---|
| 4,804,266 A | * | 2/1989 | Barshad | G01J 3/06 356/308 |
| 5,015,069 A | | 5/1991 | Bryan et al. | |
| 5,096,295 A | | 3/1992 | Krupa et al. | |
| 5,231,462 A | * | 7/1993 | Dschen | G01J 3/433 356/328 |

(Continued)

OTHER PUBLICATIONS

Luca Poletto, Off-axis pivot mounting for aberration-corrected concave gratings at normal incidence, Applied Optics, vol. 39, No. 7, Mar. 1, 2000.

*Primary Examiner* — Maurice Smith
(74) *Attorney, Agent, or Firm* — Thomas | Horstemeyer, LLP; N. Andrew Crain; Jason M. Perilla

(57) ABSTRACT

Aspects of blending data detected by a monochromator over multiple wavelength ranges is described herein. In one embodiment, the monochromator includes a diffraction grating, a grating drive motor that rotates the diffraction grating to provide, by diffraction of broadband light, first dispersed wavelengths of light and second dispersed wavelengths of light, a detector that detects a first reflection from the first dispersed wavelengths of light and a second reflection from the second dispersed wavelengths of light, and processing circuitry that blends data values from the first reflection and data values from the second reflection together to provide a spectrum of combined data values. By blending data detected over multiple ranges, measurements of relatively high precision and quality can be provided over a wider spectral range.

20 Claims, 14 Drawing Sheets

(56) References Cited

U.S. PATENT DOCUMENTS

| | | |
|---|---|---|
| 5,233,405 A | 8/1993 | Wildnauer et al. |
| 5,359,409 A | 10/1994 | Wildnauer et al. |
| 5,373,359 A | 12/1994 | Woollam et al. |
| 5,488,240 A | 1/1996 | Hlousek et al. |
| 7,483,134 B2 | 1/2009 | Toth et al. |
| 2002/0044280 A1 | 4/2002 | Weigold et al. |
| 2006/0176480 A1 | 8/2006 | Toth et al. |
| 2008/0204711 A1 | 8/2008 | Harrison et al. |
| 2010/0073667 A1 | 3/2010 | Cyr et al. |
| 2012/0262713 A1 | 10/2012 | Florek et al. |
| 2015/0138536 A1* | 5/2015 | Workman ............. G01J 3/0202 356/51 |

* cited by examiner

DATA BLENDING MULTIPLE DISPERSIVE RANGE MONOCHROMATOR

BACKGROUND

Monochromators are optical instruments used to separate monochromatic light from a wider range of wavelengths of light. To spatially separate colors or bands of broadband light, a monochromator can rely upon optical dispersion by way of a prism or diffraction by way of a diffraction grating. Grating monochromators can disperse broadband light over a certain range of wavelengths, such as ultraviolet, visible, or infrared, for example, using replica gratings.

BRIEF DESCRIPTION OF THE DRAWINGS

Aspects of the embodiments described herein can be better understood with reference to the following drawings. The elements in the drawings are not necessarily to scale, with emphasis instead being placed upon clearly illustrating the principles of the embodiments. Additionally, certain dimensions or positionings can be exaggerated to help visually convey certain principles. In the drawings, similar reference numerals between figures designate like or corresponding, but not necessarily the same, elements.

DESCRIPTION

Monochromators generally rely upon optical dispersion provided by a prism or a diffraction grating. In this context, it is noted that prisms and diffraction gratings can be used to spatially separate colors into separate wavelengths of broadband or white light. A diffraction grating comprises an optical element having a periodic structure that separates and diffracts broadband light into its constituent wavelength components. The components can be separated in direction after reflection, based on a spacing of the periodic structure of the grating, for example.

A monochromator capable of blending together a number of ranges of detected data values is described herein. In one example, the monochromator includes a tandem diffraction grating and a number of different detectors to detect reflections of light over a number of different wavelength ranges. The monochromator is configured to blend data detected over the number of different wavelength ranges, such as ranges including both the color and near infrared or infrared spectrums. By using a number of different diffraction gratings and/or detectors and blending a number of data values captured over different wavelength ranges, measurements of relatively high precision and quality can be provided a wider spectral range.

Figure 1:
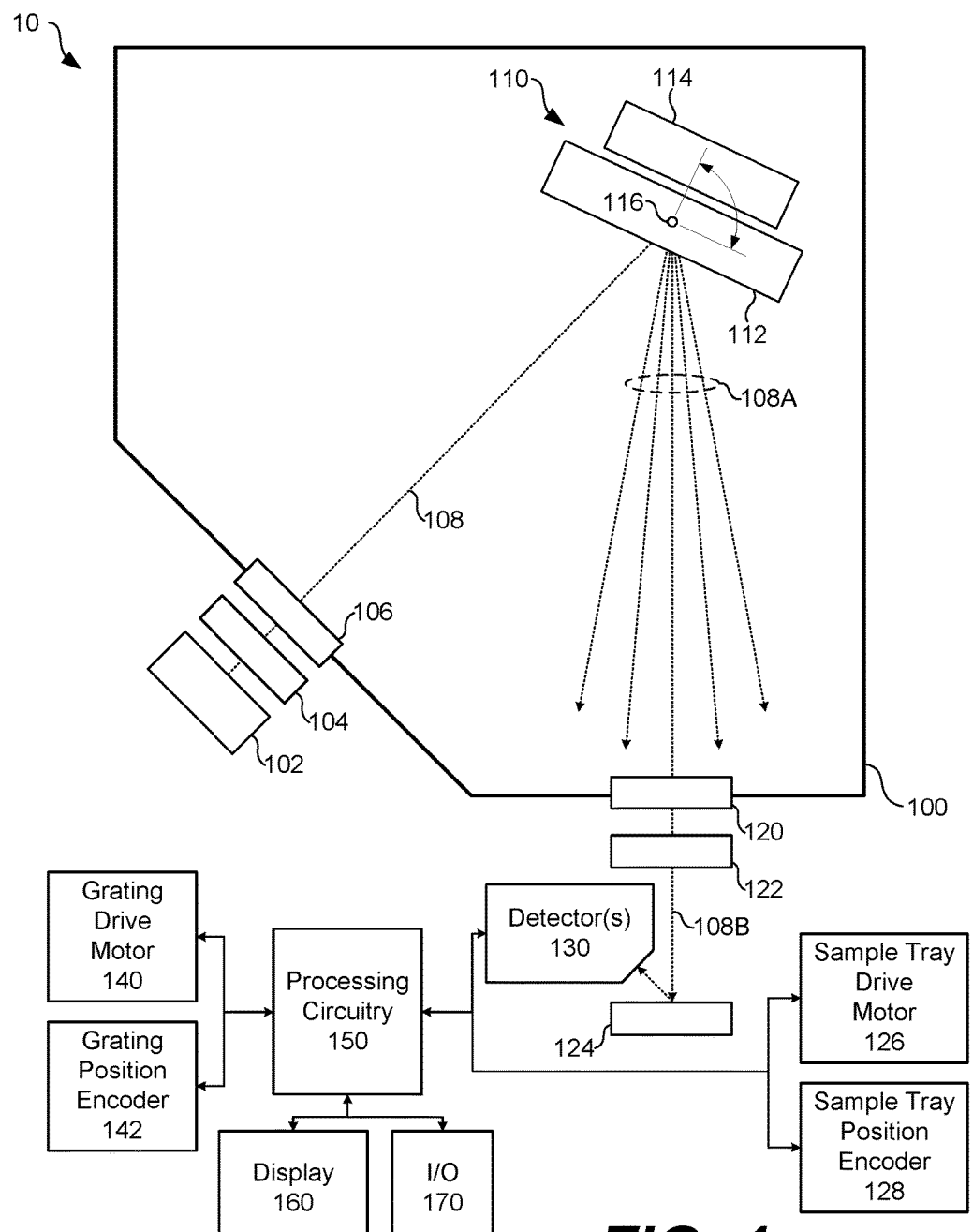
FIG. 1 illustrates an example tandem dispersive range monochromator including a tandem diffraction grating according to an embodiment described herein.

In the following paragraphs, a monochromator and its elements or components is described, followed by a discussion of the operation of the same. FIG. 1 illustrates an example monochromator 10 including a tandem diffraction grating 110 according to an embodiment described herein. The monochromator 10 can be enclosed in a housing (not shown), within which one or more platforms or other supporting means are relied upon to mount and support the components described herein. As illustrated, the monochromator 10 includes an enclosure 100 for a tandem diffraction grating 110. The enclosure 100 can be embodied as one or more walls and/or baffles, for example, which restrict the entry and/or exit of stray light, but is not limited to any size, shape, or construction.

Among other elements, the monochromator 10 further includes a light source assembly 102, an entrance optics assembly 104, an entrance slit assembly 106, an exit slit assembly 120, an exit optics assembly 122, a sample tray 124, a sample tray drive motor 126, a sample tray position encoder 128, a detector 130, a grating drive motor 140, a grating position encoder 142, processing circuitry 150, a display 160, and input/output (I/O) interfaces 170. As described in further detail below, among other functions, the processing circuitry 150 controls the grating drive motor 140 to rotate the tandem diffraction grating 110 over different dispersive side surfaces about a pivot point 116, to disperse broadband light over a wider range of wavelengths more accurately than would be possible with a single dispersive side surface. To provide a spectrum of combined data values for display on the display 160, the processing circuitry 150 is also configured to blend together a number of data values detected by the detector 130.

In one embodiment, the light source assembly 102 includes a halogen light bulb, although any source of broadband light suitable for the application can be relied upon among embodiments. The entrance optics assembly 104 can include optical elements that collimate the broadband light, such as one or more spaced-apart expander and/or planoconvex lenses or other elements, without limitation. The entrance slit assembly 106 includes a slit though which at least a portion of the broadband light 108 can be selectively passed into the enclosure 100. Among embodiments, the size of the entrance slit can be selected for suitable performance of the monochromator 10, and the slit can be selectively covered and/or uncovered by a sliding shutter (not shown) driven by an offset solenoid (not shown), for example. Any suitable shutter mechanism can be used for this purpose. The shuttering operation of the solenoid can be controlled by the processing circuitry 150, for example, during various operations of the monochromator 10, such as dark scan, calibration (or reference) scan, and live scan operations, for example.

Within the enclosure 100, the tandem diffraction grating 110 is mounted to rotate about the pivot point 116 by way of the grating drive motor 140. Thus, the tandem diffraction grating 110 can be rotated under the control of the processing circuitry 150, as described herein. In one embodiment, the tandem diffraction grating 110 includes a first ultra-violet (UV) to visible (VIS) grating 112 and a second near-infrared (NIR) to infrared (IR) grating 114. In other embodiments, the tandem diffraction grating 110 can include more than two dispersive gratings. For example, the tandem diffraction grating 110 can include three or more dispersive gratings, each selected to disperse a particular range of wavelengths of light. It is also noted that the tandem diffraction grating 110 can take various forms and/or shapes other than that illustrated in the figures, and the relative positions of the first UV-VIS and second NIR-IR gratings 112 and 114 can be reversed or otherwise altered. The monochromator 10 need not include a tandem diffraction grating in all cases, however. In other words, the monochromator 10 can include a single (i.e., non-tandem) dispersive grating, and the use of a single dispersive grating is within the scope of the embodiments.

The diffraction gratings described herein can be embodied as substrates of various sizes with parallel grooves replicated on their surfaces, as would be appreciated in the art. A diffraction grating, such as the gratings 112 and 114, disperses broadband light 108 by spatially separating it according to wavelength, resulting in first dispersed wavelengths of light 108A and second dispersed wavelengths of light 108C (FIG. 2), respectively. Various methods of manufacture of diffraction gratings are known in the field, and the diffraction gratings described herein can be manufactured using any known method, such as by replication from master gratings, interferometric control, holographic generation, ion etching, or lithography, for example. Diffraction gratings can also include a coating of reflective material over the grooves, to reflect light.

In various embodiments, the first and second diffraction gratings 112 and 114 can be selected for use over any desired range of wavelengths and sourced from any manufacturer of diffraction gratings, such as Optometrics Corporation of Littleton, Mass., Grating Works of Acton, Mass., or Richardson Gratings™ of Rochester, N.Y., for example and without limitation. One example of a diffraction grating for use with near IR wavelengths is a Hitachi Holographic Grating with a groove density of about 600 grooves per mm, although it should be appreciated that the use of other diffraction gratings is within the scope and spirit of the embodiments.

Certain diffraction gratings have specific, blazed efficiency curves. The choice of an optimal efficiency curve for a grating depends on the specific application. In the context of a monochromator, linear efficiency is usually desired. In other words, the intensity of the diffracted bands of light should be constant across the spectral range of light being dispersed. It is noted, however, that the efficiency (e.g., the power or intensity of monochromatic light diffracted relative to the intensity of the incident light) and linearity of a diffraction grating is generally not constant as the angle of incident light upon the grating is varied. In other words, as a diffraction grating is rotated in the presence of incident light upon its surface, the intensity and/or linearity of the diffracted bands of light may not be perfectly uniform or linear. This lack of uniformity generally results in some measure of error or increased signal-to-noise ratio in measurements taken by monochromators.

The variation in the output of diffracted bands of light during scanning varies respectively among different diffraction gratings. Thus, variations in the intensity and/or linearity of the diffracted bands of light (and other operating factors) for each of the gratings 112 and 114, respectively, is compensated for (at least in part) by individual control of the rate of angular velocity or displacement of the gratings 112 and 114 and the dispersive range blending and signal to noise ratio enhancement processes described herein.

As for the angular velocity control, the processing circuitry 150 can control the grating drive motor 140 to control the rate of angular velocity or displacement for the first diffraction grating 112 in a way that is different than (e.g., faster or slower) that for the second diffraction grating 114. As described below with reference to FIGS. 4A and 4B, the rate of angular velocity or displacement for the first diffraction grating 112 can be different than that for the second diffraction grating 114, to take into account an offset distance between the pivot point 116 of the tandem diffraction grating 110, which can be coincident to the surface of the first diffraction grating 112, and a surface of the second diffraction grating 114. This varied or variable angular rate control aspect is unique because conventional drive systems generally operate at the same speed over both the UV-VIS and NIR-IR spectral regions. The direct and computer controlled drive system described herein can be modified for variable scan rates and numbers of sweeps depending upon signal-to-noise and dispersive grating specifications.

The processing circuitry 150 can also control the grating drive motor 140 to control the rate of angular velocity or displacement for the first diffraction grating 112 to be faster or slower over certain portions of the useful range of diffracted bands of light provided from the first diffraction grating 112. Further, the processing circuitry 150 can control the grating drive motor 140 to control the rate of angular velocity or displacement for the second diffraction grating 114 to be faster or slower over certain portions of the useful range of diffracted bands of light provided from the second diffraction grating 114. Thus, even for a single grating, the angular velocity of the grating can be varied over its own useful range of diffraction.

Similar to the types of problems exhibited by diffraction gratings, detectors have certain efficiency and accuracy characteristics over certain wavelength ranges. Ideally, the detector 130 would be capable of detecting data values over a wide range of wavelengths of light with the same level of accuracy (e.g., signal to noise ratio) over the entire range of wavelengths. In practice, over a detector range of 700 nm to 2600 nm, for example, the signal to noise ratio of data values detected by the detector 130 might be degraded to half in the range from 2400 nm to 2500 nm and to a quarter in the range from 2500 nm to 2600 nm.

As described in further detail below, variations in the intensity and/or linearity of the diffracted bands of light from the gratings 112 and 114, variations in the signal to noise ratio of data values detected by the detector 130 using those diffracted bands of light over different wavelength ranges, and other operating factors can be compensated for (at least in part) by blending and enhancing data values.

Referring again to FIG. 1, after being reflected from the first diffraction grating 112 of the tandem diffraction grating 110, the exit slit assembly 120 passes a first portion 108B of the first dispersed wavelengths of light 108A out from the enclosure 100. The exit slit assembly 120 can include a physical slit in the enclosure 100 through which the first portion 108B of light can pass. In some embodiments, rather than a physical slit, the exit slit could be an electronic slit, such as a liquid crystal, LCD, or similar device that can be turned off or on to either block or transmit light through a virtual aperture of a particular shape and size. As another example, a fiber optic can be used to construct a slit for a specific type of detection system. In effect, any suitable structure can be used for restricting the shape and/or size of the dispersed monochromatic light that reaches the detector 130.

The exit optics assembly 122 includes optical elements that collect the first portion 108B of light, such as one or more plano-convex collection lenses, for example, without limitation. In some embodiments, the exit optics assembly 122 can also include one or more 45° mirrors, etc., to further direct the first portion 108B of light within the monochromator 10.

After being collected and/or directed by the exit optics assembly 122, the first portion 108B of the first dispersed wavelengths of light 108A falls incident upon the sample tray 124 and/or a sample for evaluation in or on the sample tray 124. In turn, the first portion 108B of light is reflected off the sample and captured by the detector 130. In one embodiment, the detector 130 is positioned proximate to the sample tray 124 and measures the intensity of the light reflected from the sample or the fraction of radiation absorbed by the sample at specific wavelengths (i.e., the absorbance of the sample). The detector 130 further converts the first portion of reflected light to an electrical signal for conversion to data values from which a quantitative analysis of a variety of characteristics of the sample, including constituent analysis, moisture content, taste, texture, viscosity, etc., can be determined.

The detector 130 can include one or more lensed assemblies including one or more image or light sensors that observe the reflection of light from the sample at a point of illumination. The field of view of the detector 130 can be restricted and the relative geometry and/or placement of the lensed assemblies can be selected to maximize energy collection while minimizing stray light inclusion. To further maximize energy collection by the detector 130, an order sorting filter can also be included within the entrance or exit optics assemblies 104 or 122. Further details regarding the geometry of the detector 130 and the sample tray 124 are described below with reference to FIGS. 5A-5C.

The grating drive motor 140 rotates the tandem diffraction grating 110 about the pivot point 116. The processing circuitry 150 controls the position, rate of angular velocity, and/or acceleration of the tandem diffraction grating 110 by way of the grating drive motor 140. Because the tandem diffraction grating 110 includes two or more diffraction gratings, each having respective optical properties, the processing circuitry 150 controls the angular velocity and/or acceleration of each diffraction grating individually. Among embodiments, the grating drive motor 140 can be embodied as any suitable permanent magnet stepper motor that directly drives the rotation of the tandem diffraction grating 110, although other types of motors can be used. For example, variable reluctance motors, brushless DC motors, hybrid stepper motors, or servo motors can be relied upon. Preferably, the grating drive motor 140 is selected to provide a continuous or nearly continuous range of angular displacement with good response to control by the processing circuitry 150.

The grating position encoder 142 provides feedback on the angular orientation of the tandem diffraction grating 110. For example, the grating position encoder 142 can provide an encoded signal representative of the absolute angular orientation or position of the tandem diffraction grating 110. This position information is provided to the processing circuitry 150 as feedback for control of the grating drive motor 140. In one embodiment, the grating position encoder 142 can be selected from among any suitable rotary position encoder having high enough resolution in rotary position for the application. In one embodiment, an encoder can be selected to yield a 1 in 25,600 increment of rotation, representative of 0.1 nm of dispersed monochromatic light for certain diffraction gratings. The position or increment of rotation can be interpolated in some embodiments for even greater resolution of rotary position. One example of such a rotary position encoder is the HEIDENHAIN ERN 480 encoder unit, although other types of encoders can be relied upon among embodiments.

In one aspect, the processing circuitry 150 controls the grating drive motor 140 to regulate an angular velocity of the tandem diffraction grating 110 based on an angular orientation of the tandem diffraction grating 110. In this context, because the angular orientation of the tandem diffraction grating 110 can be used to identify which surface of the first and second diffraction gratings 112 and 114 is facing and dispersing the portion of the broadband light 108, the processing circuitry 150 can control the grating drive motor 140 to regulate an angular velocity of the tandem diffraction grating 110 accordingly. In another aspect, the processing circuitry 150 further controls the grating drive motor 140 to regulate the angular velocity of the tandem diffraction grating 110 based on the angular orientation of the tandem diffraction grating 110 and an offset distance between the pivot point 116 and a surface of the second diffraction grating 114, as further described below.

The sample tray drive motor 126 rotates the sample tray 124 about a pivot point. The processing circuitry 150 controls an angle of incidence of the first portion 108B of light upon the sample tray 124 and/or a sample in or on the sample tray 124. The sample tray position encoder 128 provides feedback on the angular orientation of the sample tray 124 to the processing circuitry 150. The angular orientation information from the sample tray position encoder 128 is provided to the processing circuitry 150 as feedback for control of the sample tray drive motor 126. In one aspect, the processing circuitry 150 controls the sample tray drive motor 126 to adjust an angle of incidence of the first portion 108B of light upon the sample tray 124, depending upon the type of measurement being taken by the monochromator 10. Further details regarding control of the angle of incidence of the first portion 108B of light upon the sample tray 124 are described below with reference to FIGS. 5A-5C.

The processing circuitry 150 can be embodied as one or more circuits, processors, processing circuits, or any combination thereof that monitors and controls the elements of the monochromator 10. In this context, the processing circuitry 150 can be configured to capture, store, and analyze signals and/or data provided by the detector 130, forward and/or display captured data to another computing device or the display 160, receive control feedback from a user operating the I/O interfaces 170, and store and process various types of data. The processing circuitry 150 can also be configured to perform the necessary calculations and output control signals to elements of the monochromator 10, so as to implement the processes described below with reference to FIGS. 6A-6C. Further, the processing circuitry 150 can also include driver circuitry for powering and/or driving the grating drive motor 140 and the sample tray drive motor 126, among other elements which are under computer control.

While a more detailed description of the operation of the monochromator 10 is described below, a brief overview of the operation is described here for additional context before turning to the remaining figures. In operation, the light source of the light source assembly 102 emits a relatively broad spectrum of light or radiation. The entrance optics assembly 104 collimates the broadband light, and at least a portion of the broadband light is then projected through an entrance slit of the entrance slit assembly 106 and onto the tandem diffraction grating 112. The tandem diffraction grating 110 provides (i.e., reflects) first dispersed wavelengths of light 108A by diffraction of the portion of the broadband light incident upon it. The tandem diffraction grating 110 is positioned and rotated over time by the grating drive motor 140 so that the first portion 108B of the first dispersed wavelengths of light 108A, which varies or scans over time, passes through an exit slit of the exit slit assembly 120, while the exit slit assembly 120 blocks other wavelengths of the light 108A from exiting the enclosure 100.

The first portion 108B of the light 108A that passes through the exit slit is determined by the angle of the tandem diffraction grating 110, and a spectrum of UV-VIS and NIR-IR light is scanned by rotation of the tandem diffraction grating 110 by the grating drive motor 140. The first portion 108B of the light 108A that passes through the exit slit is collected by the exit optics assembly 122 and directed incident onto a sample in the sample tray 124. The detector 130, which is situated proximate to the sample tray 124, measures the intensity of diffused, reflected light from the sample and converts the power of the reflected light into an electrical signal and/or data values. Using the electrical signal and/or data values, a quantitative analysis of the characteristics of the sample, such as sample constituents, moisture content, taste, texture, viscosity, etc., can be quantitatively determined.

Based on the characteristics of the tandem diffraction grating 110, the monochromator 10 provides the dispersion capability of multiple monochromators in one unit. That is, the monochromator 10 provides the dispersion capability of an ultra-violet to visible spectra monochromator and a near infrared to infrared spectra monochromator, for example, although additional or other spectral ranges are within the scope and spirit of the embodiments described. As described herein, the tandem diffraction grating 110 can be rotated about the pivot point 116 (FIG. 1) to make use of both sides of the UV-VIS and NIR-IR gratings 112 and 114.

By making use of the tandem diffraction grating 110, the monochromator 10 provides accurate dispersion capabilities over non-overlapping (or partially overlapping) spectra, to achieve wider dispersion than would otherwise be possible with a conventional (i.e., non-tandem) grating. As compared to a monochromator that includes a single, conventional grating adapted or manufactured for a relatively wide spectral range of operation, the use of the tandem diffraction grating 110 provides dispersion capabilities over at least as wide of a range (e.g., as the conventional grating), but with better precision, resolution, and/or granularity. The separate gratings allow optimization of linewidths to meet more stringent requirements for linewidth over multiple spectral regions or ranges.

Further, making use of the tandem diffraction grating 110, reliance upon two separate monochromators can be averted. Particularly, the monochromator 10 can be relied upon to make relatively high quality spectroscopic measurements over the UV-VIS-NIR-IR range of 190 nanometers to 3000 nanometers, for example. This results in less overall cost as compared to using separate monochromators, respectively, for the UV-VIS and NIR-IR ranges, in a smaller footprint. It is noted that using two monochromators can be cost and/or time prohibitive and results in energy loss for each beam, especially when additional optics must combine the beams at a sample.

The use of a single grating over the full UV-VIS-NIR-IR spectral region can result in lower quality and spectral resolution to make true color (e.g., CIE (International Commission on Illumination) Color Coordinates and L*a*b* Color Space certified measurements) and extended range NIR and IR measurements. However, the monochromator 10 need not include a tandem diffraction grating in all cases. In some cases, the monochromator 10 can include a single (i.e., non-tandem) dispersive grating, and the data blending and signal to noise ratio enhancement processes described herein can be used to increase the spectral resolution of the monochromator 10.

Figure 2:
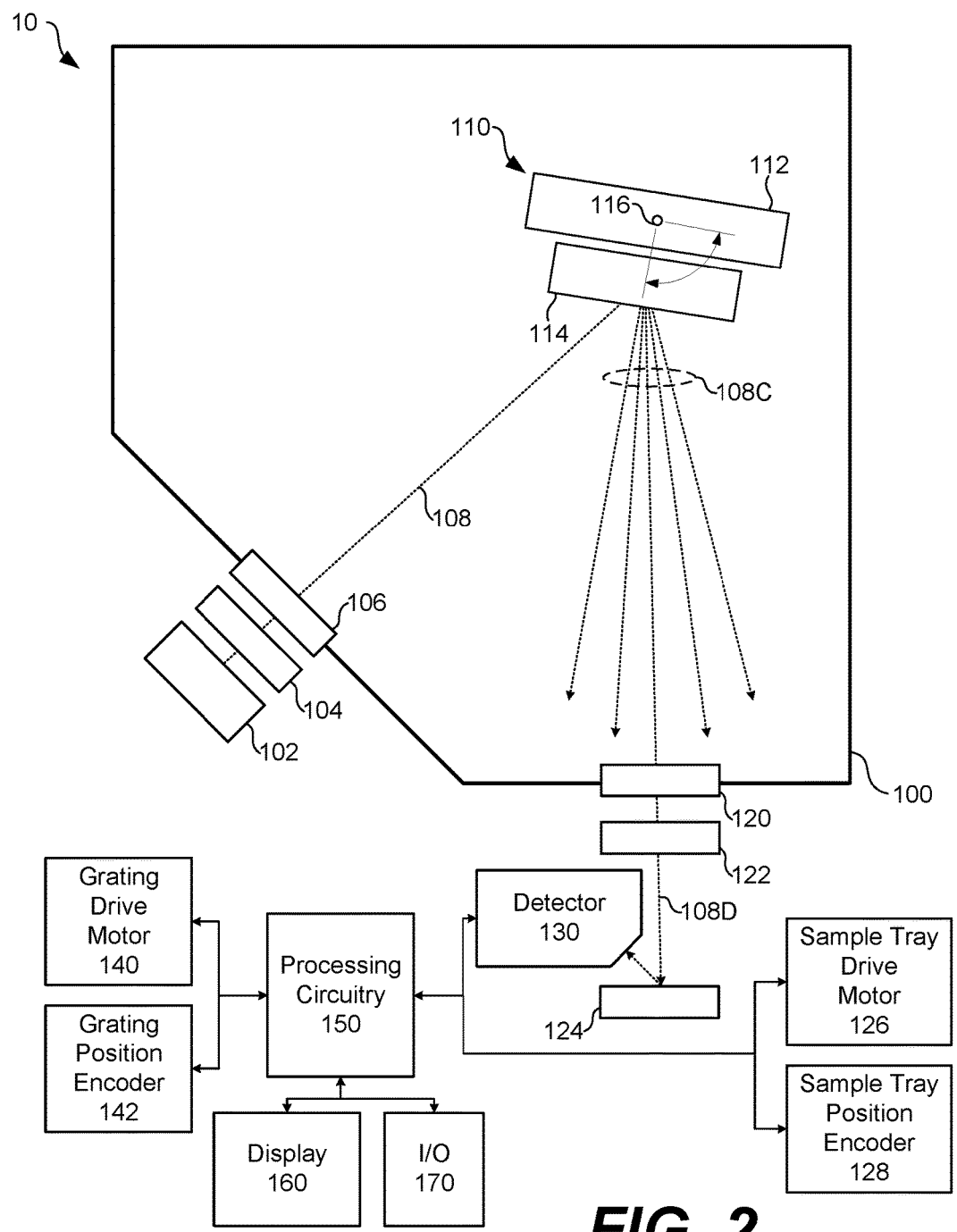
FIG. 2 illustrates the tandem dispersive range monochromator of FIG. 1 with a rotated tandem diffraction grating.

Turning to FIG. 2, the monochromator 10 of FIG. 1 is illustrated with the tandem diffraction grating 110 being rotated. In FIG. 2, the tandem diffraction grating 110 has been rotated so that the broadband light 108 is incident upon the surface of the second diffraction grating 114, rather than upon the surface of the first diffraction grating 112, as in FIG. 1. As illustrated, the second diffraction grating 114 disperses the broadband light 108 by spatially separating it according to wavelength, resulting in the second dispersed wavelengths of light 108C. After being reflected from the first diffraction grating 114, the exit slit assembly 120 passes a second portion 108D of the second dispersed wavelengths of light 108C out from the enclosure 100.

It should be noted here that, although the diffractive surface of the first diffraction grating 112 can be aligned for rotation (i.e., on-axis) about the pivot point 116, the diffractive surface of the second diffraction grating 114 is offset by a distance from the pivot point 116 (i.e., off-axis). The processing circuitry 150 takes this distance, among other geometric characteristics and/or positions of the elements of the monochromator 10, into account when rotating the tandem diffraction grating 110. Thus, in various embodiments, one of the UV-VIS or NIR-IR gratings is utilized on-axis, and the other one of the UV-VIS or NIR-IR gratings is utilized off-axis. If the UV-VIS grating is used off-axis, it can be used with a standard shape of grating but special slewing characteristics specifically adapted for color measurements. In this context, some embodiments can rely upon a nominal bandwidth and resulting lineshape of the UV-VIS system to be approximately one-half that of the NIR-IR system.

As indicated above, according to aspects described herein, the processing circuitry 150 takes into account the spatial relationships (e.g., distances) between the grating surfaces of the first and second diffraction gratings 112 and 114 with respect to the entrance slit and the monochromatic wavelength incident on the exit slit. The processing circuitry 150 further controls the grating drive motor 140 to regulate the angular velocity of the tandem diffraction grating 110 based on the angular orientation of the tandem diffraction grating 110 and an offset distance between the pivot point 116 and a surface of the second diffraction grating 114. In this context, in one embodiment, the processing circuitry 150 controls the grating drive motor 140 to regulate a first angular velocity of the tandem diffraction grating 110 over a first range of motion for the first diffraction grating 112, and controls the grating drive motor 140 to regulate a second angular velocity of the tandem diffraction grating 110 over a second range of motion for the second diffraction grating 114. In other aspects, the processing circuitry 150 can blend together first data values detected by the detector 130 using light from the first diffraction grating 112 and second data values detected by the detector 130 using light from the second diffraction grating 114.

Figure 3:
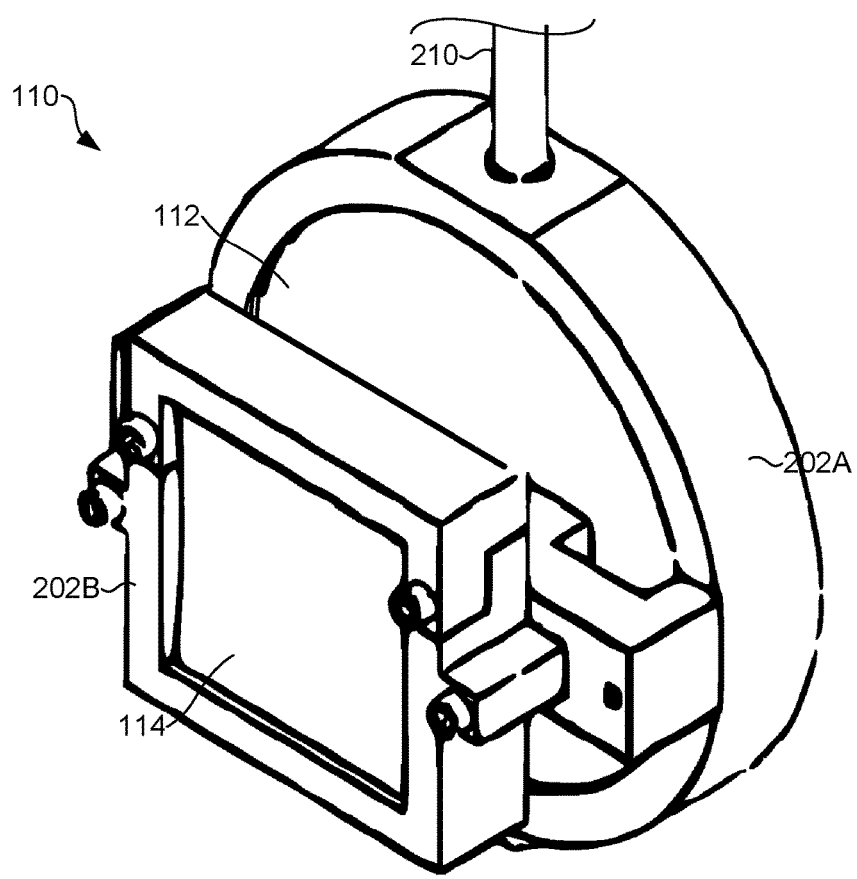
FIG. 3 illustrates a perspective view of an example tandem diffraction grating of the monochromator of FIG. 1 according to an embodiment described herein.

FIG. 3 illustrates a perspective view of the tandem diffraction grating 110 of the monochromator 10 of FIG. 1 according to an embodiment described herein. The tandem diffraction grating 110 includes a mounting assembly and first and second diffraction gratings 112 and 114. The mounting assembly includes a mount 202A for the first diffraction grating 112 and a mount 202B for the second diffraction grating 114. A cylindrical (or other suitable shape of) shaft 210 is attached to the mounting assembly, as illustrated in FIG. 3. The mounting assembly, including the mounts 202A and 202B for the first and second diffraction gratings 112 and 114, the cylindrical shaft 210, and any other associated hardware of the assembly (e.g., screws, bolts, etc.) can be formed from any material suitable for the application, such as stainless steel or other metals, for example. Generally, the materials for the mounting assembly should be selected so as to minimize flexibility in the mounting assembly, especially under change in angular acceleration. Such flexibility can translate into variations in the linearity or expected output of the dispersed wavelengths of light from the tandem diffraction grating 110. The cylindrical shaft 210 can be anchored at one or more distal ends via upper and/or lower shaft bearings. The construction for the mounting assembly of the tandem diffraction grating 110 is generally designed to assure precise, unwavering alignment.

Here, it is noted that the mounting assembly of the tandem diffraction grating 110 can be relied upon to upgrade or retrofit a monochromator for NIR-IR spectral regions to include a diffraction grating for UV-VIS spectral regions (or vice versa), by way of the addition of an additional diffraction grating. In connection with an additional detector and/or revised scanning instructions software, as needed, the elements of the instrument can remain the same while expanding the operating capabilities of the instrument.

Figure 4A:
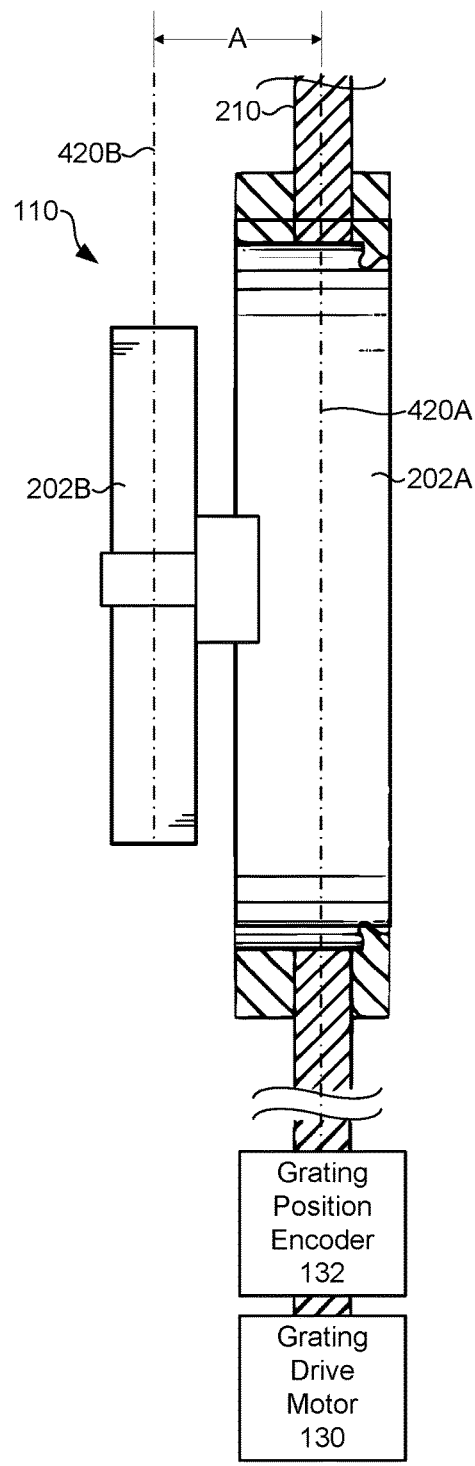
FIG. 4A illustrates a side view of the tandem diffraction grating of FIG. 3 according to an embodiment described herein.
Figure 4B:
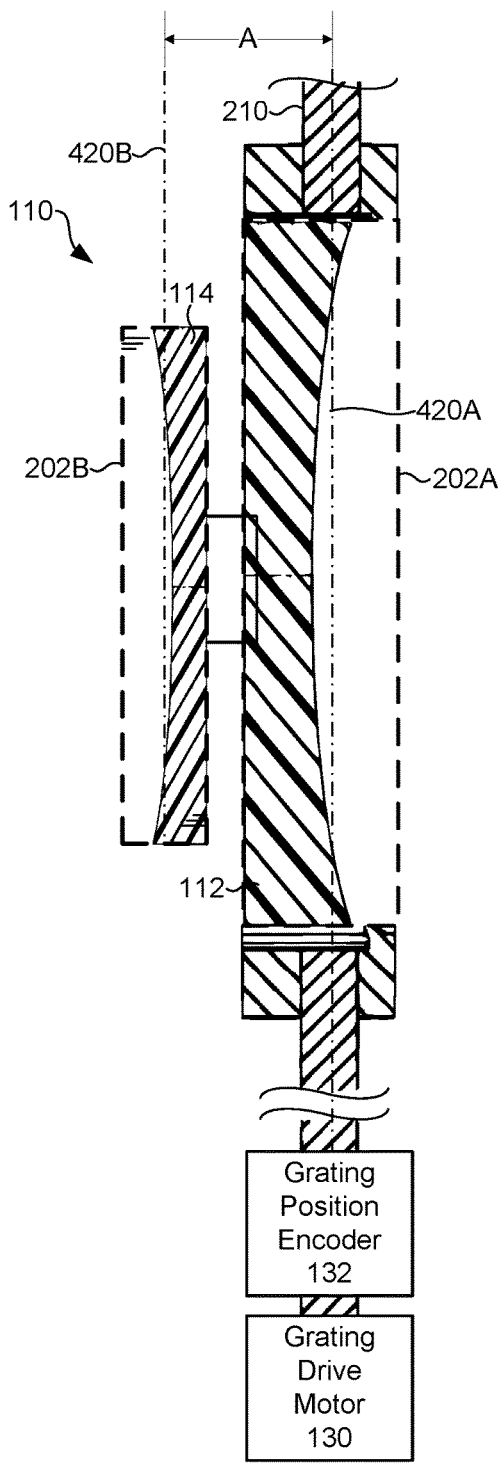
FIG. 4B illustrates a cutaway side view of the tandem diffraction grating of FIG. 3 according to an embodiment described herein.

Turning to FIGS. 4A and 4B, FIG. 4A illustrates a side view of the example tandem diffraction grating 110 of FIG. 3, and FIG. 4B illustrates a cutaway side view of the example tandem diffraction grating 110 of FIG. 3. As illustrated between FIGS. 4A and 4B, the mounts 202A and 202B hold and support the first and second diffraction gratings 112 and 114, so that the gratings 112 and 114 can be rotated by the grating drive motor 140. Also, FIGS. 4A and 4B illustrate that both the grating drive motor 140 and the grating position encoder 132 are coupled or attached to the cylindrical shaft 210. Here, as with the example illustrated in FIG. 3, it should be appreciated that the illustrated shape and dimensions of the tandem diffraction grating 110 and the first and second diffraction gratings 112 and 114 are provided by way of example only and not limitation (and can not be representative of all embodiments).

As can be seen in FIGS. 4A and 4B, centerlines 420A and 420B are drawn coincident to the surfaces of the first and second diffraction gratings 112 and 114, respectively. Also, it is noted that the centerline 420A of the first diffraction grating 112 is centered at the pivot point 116 (FIGS. 1 and 2). In FIGS. 4A and 4B, the distance "A" between the centerlines 420A and 420B is also illustrated. As outlined above, according to aspects described herein, the processing circuitry 150 accounts for the spatial relationships (e.g., distances) between the grating surfaces of the first and second diffraction gratings 112 and 114 (i.e., the distance "A") with respect to the entrance slit and the monochromatic wavelength incident on the exit slit. The processing circuitry 150 further controls the grating drive motor 140 to regulate the angular velocity of the tandem diffraction grating 110 based on the angular orientation of the tandem diffraction grating 110 and the offset distance "A" between the centerlines 420A and 420B.

Figure 5A:
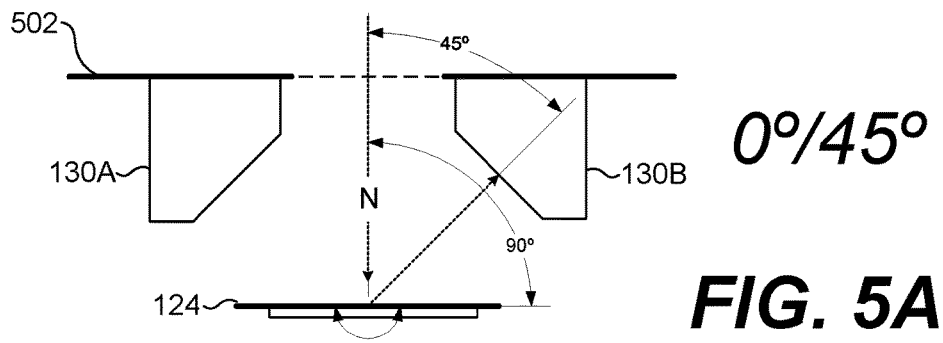
FIG. 5A illustrates an example geometry of a detector and sampling tray of the tandem dispersive range monochromator of FIG. 1 according to an embodiment described herein.
Figure 5B:
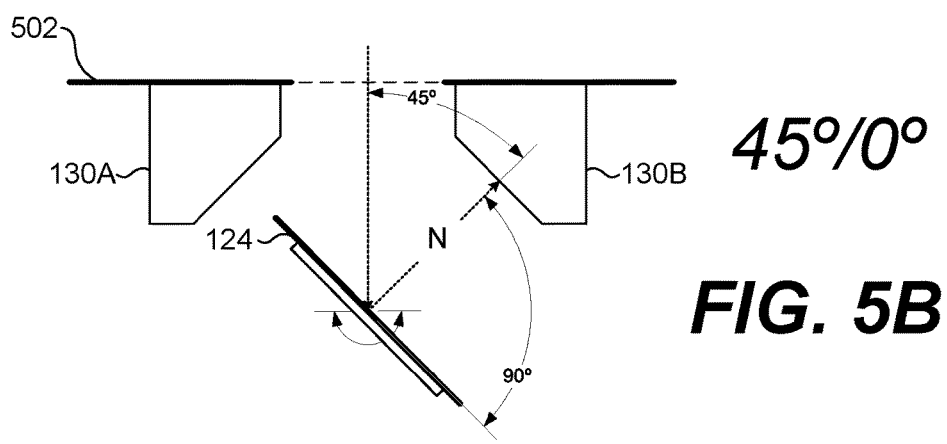
FIG. 5B illustrates a second geometry of the detector and sampling tray of FIG. 5A according to an embodiment described herein.
Figure 5C:
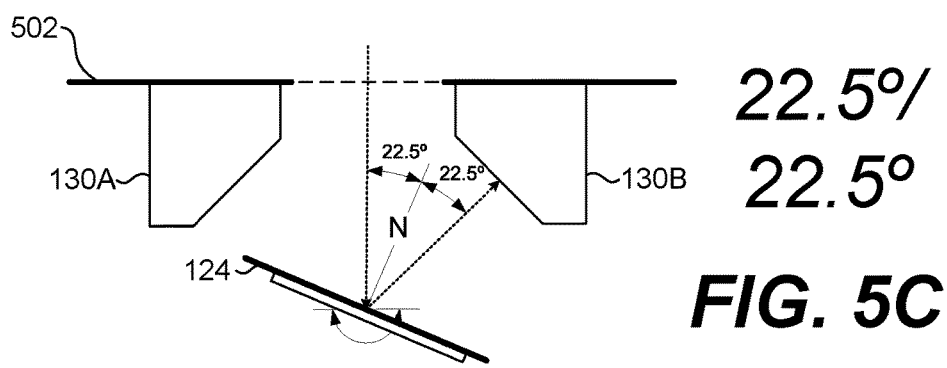
FIG. 5C illustrates a third geometry of the detector and sampling tray of FIG. 5A according to an embodiment described herein.

Turning to FIGS. 5A-5C, FIG. 5A illustrates an example geometry of the detector 130 and sampling tray 124 of the monochromator 10 of FIG. 1, FIG. 5B illustrates a second example of the geometry of the detector 130 and sampling tray 124, and FIG. 5C illustrates a third example of the geometry of the detector 130 and sampling tray 124. In FIGS. 5A-5C, the detector 130 includes separate detectors 130A and 130B. The separate detectors 130A and 130B can be relied upon, respectively, for measurements of dispersed light from the first and second tandem diffraction gratings 112 and 114. Because different optical detectors can vary in output response or responsivity over different wavelength ranges, the detector 130 can be embodied as two or more separate detectors, such as the detectors 130A and 130B, each configured for a suitable output response over a relatively narrow wavelength range. Particularly, each of the detectors 130A and 130B can be embodied as a different silicon-based multichannel array CCD (Charge Coupled Device) detector of relatively high grade for suitable sensitivity, uniformity, and noise characteristics. As one example, the detector 130A can be a CCD device tailored for use with the UV-VIS range of the first diffraction grating 112 and the detector 130B can be a CCD device tailored for use with the NIR-IR range of the second diffraction grating 114.

As described below, the example geometry of the detector 130 and sampling tray 124 in FIG. 5A can be identified as a 0°/45° geometry, the example geometry of the detector 130 and sampling tray 124 in FIG. 5B can identified as a 45°/0° geometry, and the example geometry of the detector 130 and sampling tray 124 in FIG. 5C can identified as a 22.5°/22.5° geometry. These geometries are defined with reference to the angular difference between the incidence of light upon the sampling tray 124 as compared to the normal "N" of the sampling tray 124, and the angular difference between the normal "N" of the sampling tray 124 and the direction of light reflected into the detector 130.

For some measurements, such as measurements over the color or VIS spectrum, for example, the monochromator 10 can rotate the angle of the sampling tray 124 to vary the geometry between the sampling tray 124 and one or more of the detectors 130A or 130B. Thus, to the extent that the angle of incidence of light on a sample impacts the result of a measurement taken by the monochromator 10, the processing circuitry 150 can rotate the angular orientation of the sample tray 124 by control of the sample tray drive motor 126 to capture variations in the results. Further, the processing circuitry 150 can determine either a relative or absolute angular orientation of the sampling tray 124 based on feedback from the sample tray position encoder 128.

Figure 6:
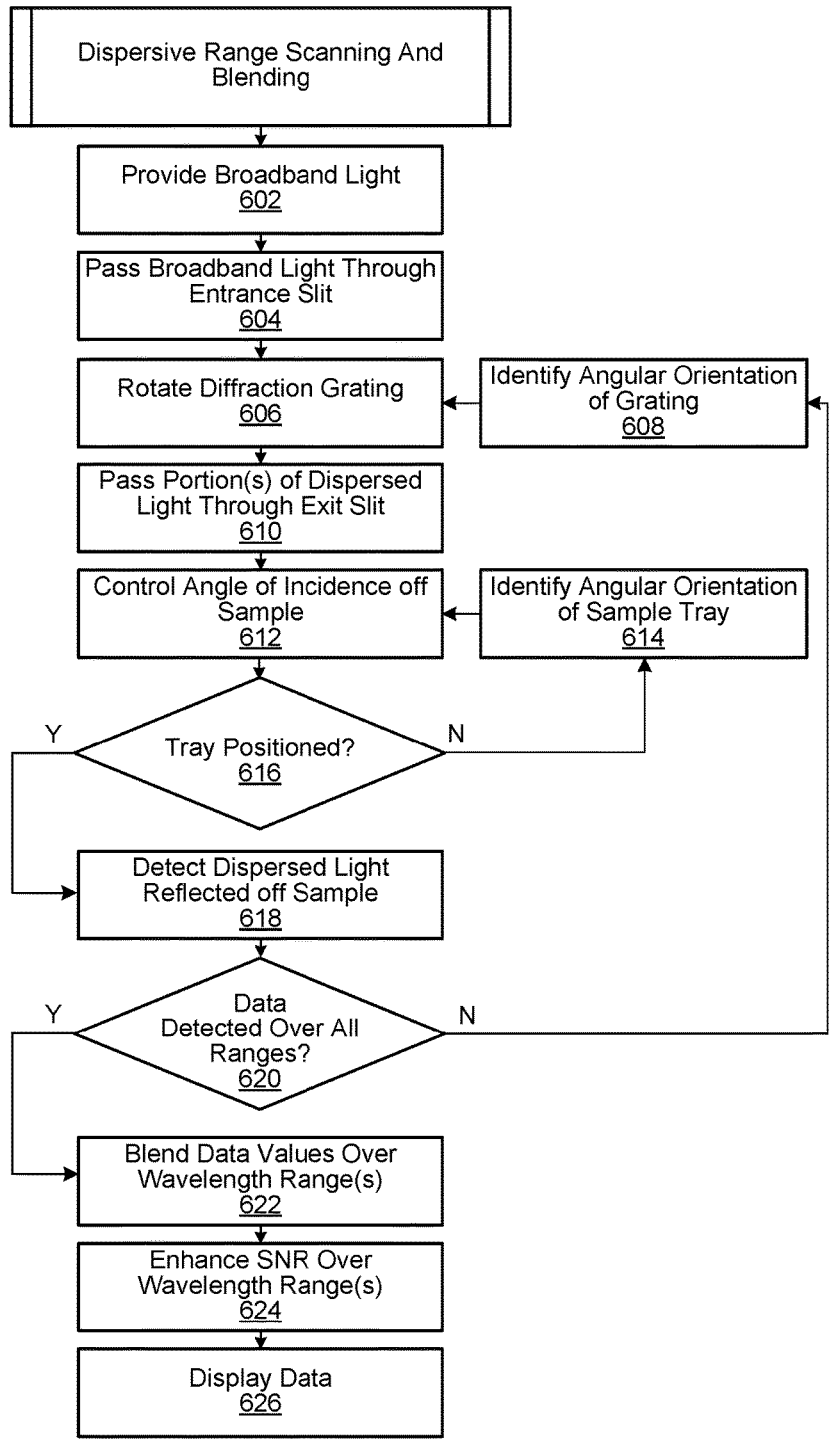
FIG. 6 illustrates an example flowchart of a process of scanning and blending performed by the monochromator of FIG. 1 according to an embodiment described herein.

Referring next to FIG. 6, a process flow diagram illustrating example processes performed by the monochromator 10 of FIG. 1 is provided. The flowchart shown in FIG. 6 (and in FIGS. 8 and 11) can be viewed as example steps performed by the monochromator 10 of FIG. 1. Although not explicitly described in all steps, the processing circuitry 150 can direct one or more components of the monochromator 10 to perform the process illustrated in FIG. 6. However, other monochromators or instruments similar to the monochromator 10 can perform the process.

FIG. 6 illustrates an example flowchart of a process dispersive range scanning and blending performed by the monochromator 10 shown in FIG. 1 according to an embodiment described herein. At reference numeral 602, the process includes providing and/or collimating broadband light. With reference to the example monochromator 10 of FIG. 1 for context, the light can be provided and/or collimated by the light source assembly 102 and the entrance optics assembly 104. At reference numeral 604, the process includes passing at least a portion of the broadband light through an entrance slit, such as one in the entrance slit assembly 106.

At reference numeral 606, the process includes rotating, by a grating drive motor, a diffraction grating about a pivot point to provide dispersed wavelengths of light by diffraction of the broadband light generated at reference numeral 602. For example, at reference numeral 606, the processing circuitry 150 can rotate the tandem diffraction grating 110 using the grating drive motor 140 based, in part, on the identification of an angular orientation of the tandem diffraction grating 110 using the grating position encoder 142 at reference numeral 608. In another example, the monochromator 10 need not include a tandem diffraction grating, and a single diffraction grating can be rotated at reference numeral 606. In either case, the grating drive motor 140 can be controlled to regulate an angular velocity of the grating at reference numeral 606 based on the angular orientation of the diffraction grating identified by the grating position encoder 142 at reference numeral 608.

The rotating at reference numeral 606 can include the processing circuitry 150 regulating the angular velocity of the tandem diffraction grating 110 based on the angular orientation of the tandem diffraction grating 110 and an offset distance between the pivot point 116 and a surface of the second diffraction grating 112. Additionally or alternatively, the controlling can include controlling the grating drive motor 140 to regulate a first angular velocity of the tandem diffraction grating 110 over a first range of motion for the first diffraction grating 112 and to regulate a second angular velocity of the tandem diffraction grating 110 over a second range of motion for the second diffraction grating 114. The controlling can also include the processing circuitry 150 controlling the grating drive motor 140 to regulate the angular velocity of the first diffraction grating 112, the second diffraction grating 114, or any other diffraction grating to vary over the useful range of the diffracted bands of light provided from any of the gratings, individually.

At reference numeral 610, the process includes passing at least a portion of the dispersed wavelengths of light though an exit slit in the exit slit assembly 120, for example. At reference numeral 612, the process includes the processing circuitry 150 controlling, using the sample tray drive motor 126, an angle of incidence of the portion of the dispersed wavelengths of light onto the sample tray 124 (and any sample on the sample tray). The controlling at reference numeral 612 can be based, in part, on the identification of an angular orientation of the sample tray 124 by the processing circuitry 150 using the sample tray position encoder 128 at reference numeral 614.

At reference numeral 616, the process includes the processing circuitry 150 determining whether the sample tray 124 is correctly positioned for the detector 130 (e.g., one of the detectors 130A and 130B) to detect reflected light off of the sample tray 124 (and any sample on the sample tray). As described above, the detector 130A can be tailored for use with UV-VIS range of the first diffraction grating 112 and the detector 130B can be tailored for use with the NIR-IR range of the second diffraction grating 114. Thus, depending upon the status of the measurement being taken, the process includes determining at reference numeral 616 whether the sample tray 124 is correctly positioned and steady enough for the detector 130A to measure or detect reflected light in the UV-VIS range and/or for the detector 130B to measure or detect reflected light in the NIR-IR range. Only when the processing circuitry 150 has confirmed that the angular orientation of the sample tray 124 is correct (and corresponds to angular orientation, angular velocity, etc. of the grating), does the process proceed to reference numeral 618. Otherwise, if the sample tray drive motor 126 is still moving the sample tray 124 (or if the monochromator 10 is not ready for any other reason), the process proceeds back to reference numerals 614 and 612, At reference numeral 618, the process includes detecting data values representative of the intensities of the dispersed wavelengths of light and/or the reflection thereof (e.g., reflection off of the sample on the sample tray 124). The detection of the data values can be achieved by the detector 130 (e.g., one of the detectors 130A and 130B), which provides an electrical signal to the processing circuitry 150 representative of an intensity, for example, of the dispersed wavelengths of light and/or reflection thereof. The data values can be stored for further processing as described herein.

At reference numeral 620, the process includes the processing circuitry 150 determining whether all the relevant data values have been detected over the relevant wavelengths of light for the measurement being conducted. As described in further detail below with reference to FIGS. 7-13, data values can be gathered a number of times over different overlapping, partially-overlapping, and/or non-overlapping wavelength ranges. Thus, the process steps at reference numerals 602, 604, 606, 608, 610, 612, 614, 616, and 618 can continue on for the measurement of data values in various ranges of wavelength, such as in the UV-VIS and NIR-IR ranges as shown in FIG. 7, among others.

Figure 7:
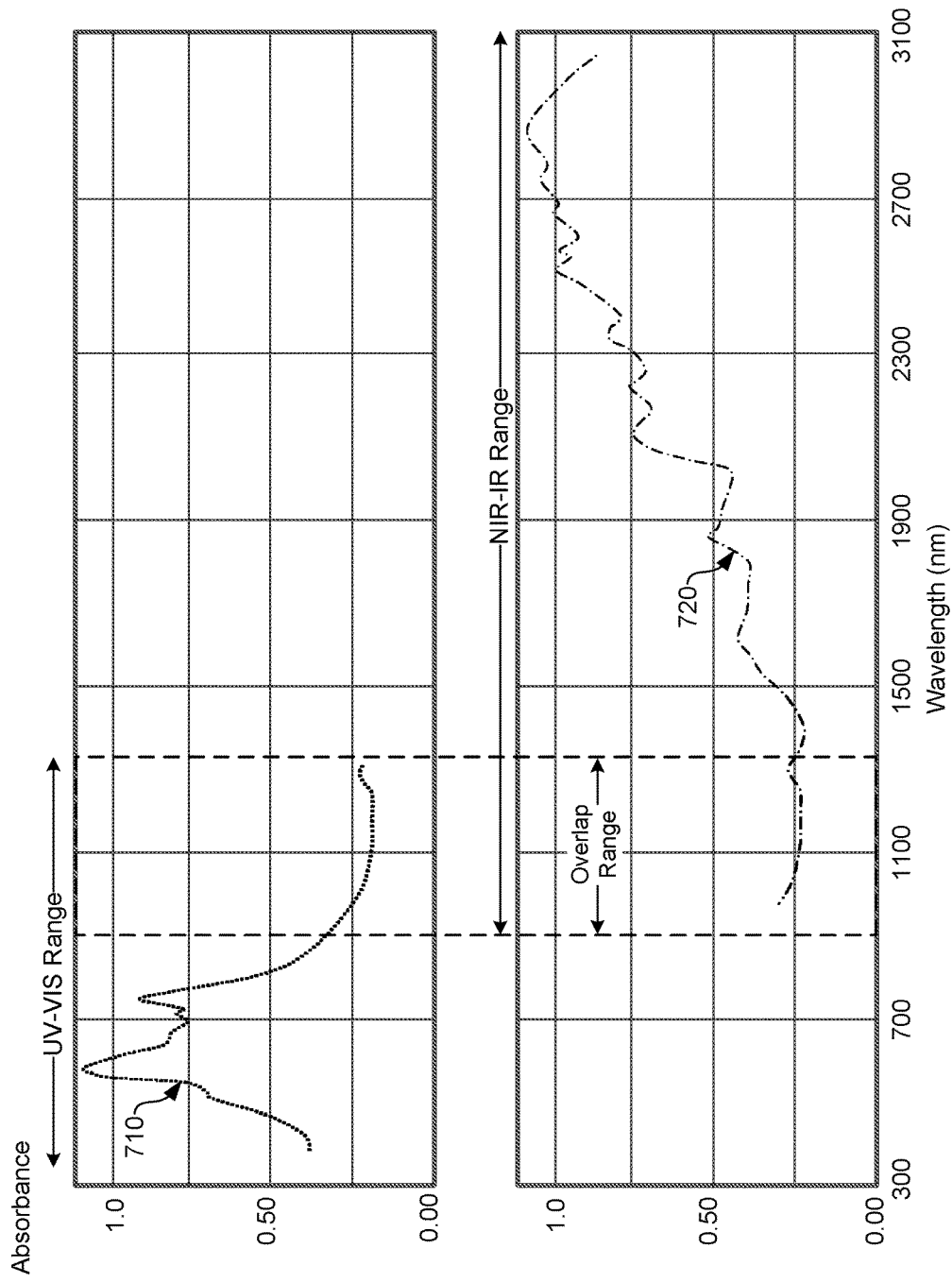
FIG. 7 illustrates example ranges of data values detected from a first reflection of first dispersed wavelengths of light and from a second reflection of second dispersed wavelengths of light.

Turning to the example shown in FIG. 7, data values captured by the detector 130A from a first reflection in the UV-VIS spectrum are plotted on the top frame as a range of first data values 710. Data values captured by the detector 130B from a second reflection in the NIR-IR spectrum are plotted on the bottom frame as the range of second data values 720. The ranges of the first and second data values 710 and 720 shown in FIG. 7 (and in FIGS. 8-11) are provided by way of example only. As illustrated, at least part of the first data values 710 overlap with the second data values 720 in an overlapping range of wavelength.

In other cases, data can be gathered over the same ranges of wavelength using the same or different detectors any number of times. In each pass, data values can be measured using faster or slower scans over the same or different wavelength ranges, capturing data at increased or decreased sampling rates. To improve the signal to noise ratio of a measurement, for example, additional data values can be gathered, multiple times, at the edge of the useful range of diffracted light provided from the same diffraction grating or at the edge of the useful range of light detection by the same detector. The data values can be gathered at an interval, such as at every nanometer in wavelength, or at any other suitable intervals.

If it is determined at reference numeral 620 that all data values are not collected, then the process proceeds back to reference numerals 608 and 606 for further control of the monochromator 10 to gather the remaining data values. On the other hand, if it is determined at reference numeral 620 that all data values have been collected, then the process proceeds to reference numeral 622.

At reference numeral 622, the process includes the processing circuitry 150 blending together a number of data values detected at reference numeral 618. A number of different data values detected over overlapping ranges in wavelength can be blended together at reference numeral 622. As one example, data values detected by the detector 130A that overlap in an overlapping range of wavelength with data values detected by the detector 130B can be blended together. In that way, the values of absorbance detected by the detector 130A can be combined, assimilated, and/or blended together with those detected by the detector 130B in the overlapping range of wavelength. The blending process performed at reference numeral 622 is described in greater detail below with reference to FIGS. 8-10.

At reference numeral 624, the process includes the processing circuitry 150 enhancing the signal to noise ratio of certain data values detected at reference numeral 618. As one example, the detector 130A can detect a range of data values over a range of wavelengths and detect a number of subset ranges of data values multiple times over one or more subranges of the range of wavelengths. At reference numeral 624, the processing circuitry 150 can average the subset ranges of data values and blend them together, over the subranges of wavelengths, with the data values detected over the full range of wavelengths. In that way, the signal to noise ratio of measurements can be improved at the edges of the useful ranges of diffracted light provided from diffraction gratings or at the edges of the useful ranges of light detection by detectors. The enhancing process performed at reference numeral 624 is described in greater detail below with reference to FIGS. 11-13.

Finally, at reference numeral 626, the process includes the processing circuitry 150 displaying results of the process shown in FIG. 6 on a display. The results can be shown on the display 160 of the monochromator 10 for analysis by a user.

Figure 8:
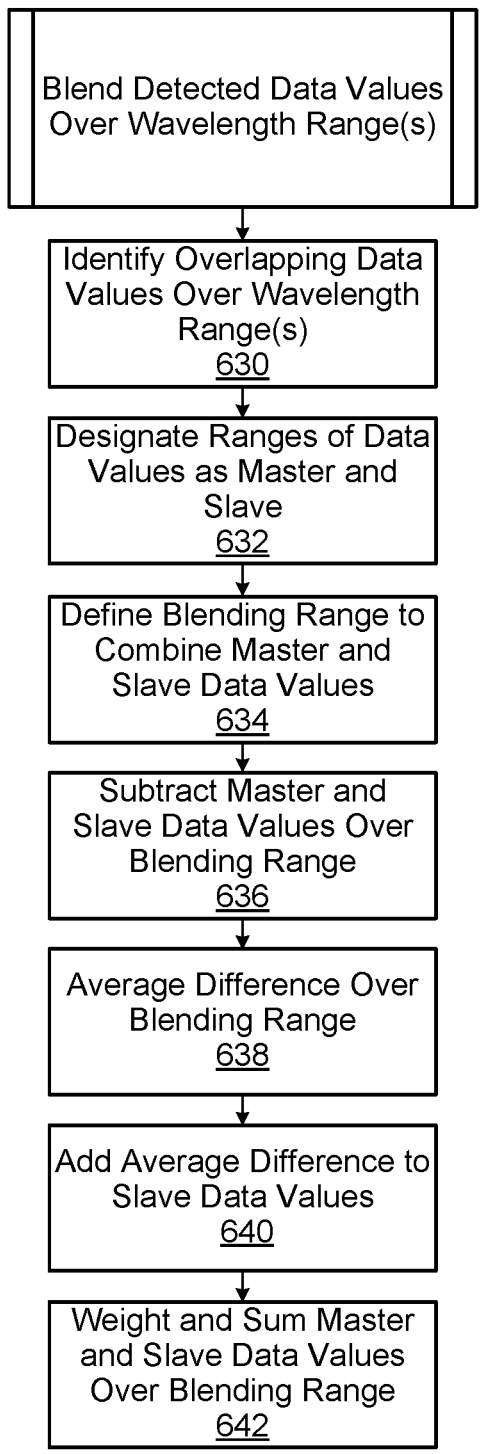
FIG. 8 illustrates an example flowchart of a process of blending performed by the monochromator of FIG. 1 according to aspects of the embodiments described herein.

FIG. 8 illustrates an example flowchart of a process of blending performed by the monochromator of FIG. 1 according to aspects of the embodiments described herein. The process steps shown in FIG. 8 are representative of a number or series of steps performed at reference numeral 622 in FIG. 6. The blending process is designed to blend or merge together two ranges of data values that overlap, at least in part, in ranges of wavelengths. Through the blending process, a larger range of data values is generated over a wider range of wavelengths.

Figure 9:
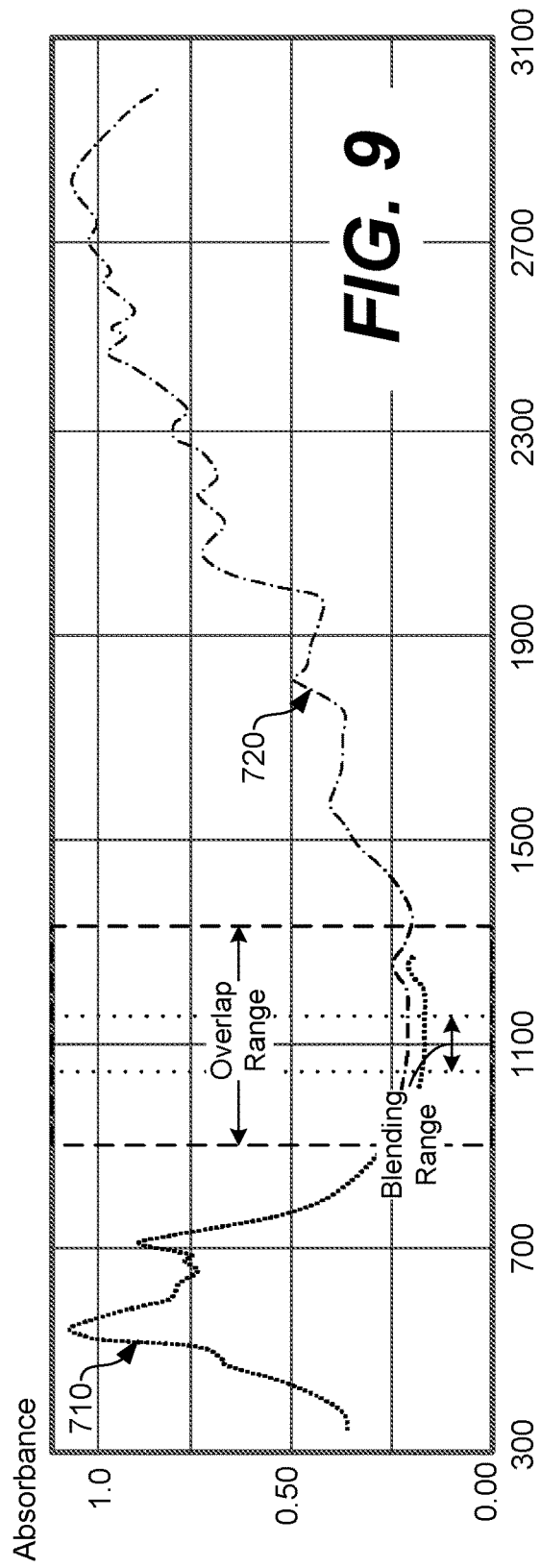
FIG. 9 illustrates example overlapping ranges of data values detected from first and second reflections of first dispersed wavelengths of light.

At reference numeral 630, the process includes the processing circuitry 150 identifying ranges of data values that overlap in an overlapping range of wavelength. As shown in FIG. 9, for example, the range of first data values 710 overlaps with the range of second data values 720 in an overlapping range of wavelength from about 850 nm to about 1250 nm. For context, the remaining steps in the process shown in FIG. 8 are described in connection with the first and second data values 710 and 720 shown in FIG. 8, although the process can be applied to any data values overlapping in ranges of wavelengths.

At reference numeral 632, the process includes the processing circuitry 150 designating one of the ranges of data values as a master range of data values and another one of the ranges of data values as a slave range of data values. According to the process described below, the slave data values are blended into the master data values. As one example, the range of first data values 710 can be designated as the master range of data values, and the range of second data values 720 can be designated as the slave range of data values. However, in another case, the range of second data values 720 can be designated as the master range of data values, and the range of first data values 710 can be designated as the slave range of data values. In any case, the selection of the master and slave ranges can be performed to determine which range of data values is blended into the other. Additionally, depending upon the size of the blending region defined at reference numeral 634, certain data points in the slave range of data values may be disposed of without further processing.

At reference numeral 634, the process includes the processing circuitry 150 defining a blending range in the overlapping range of wavelength between the range of first data values 710 and the range of second data values 720. An example blending range in the overlapping region between the first and second data values 710 and 720 is shown in FIG. 9, for example. If the overlapping range of wavelength is from about 850 nm to about 1250 nm, the blending range could be selected from about 1050 nm to about 1150 nm as shown in FIG. 9, although other blending ranges could be selected. Generally, any blending range can be used, up to the full size of the overlapping range, based on various considerations such as processing or memory requirements, processing or measurement time, blending granularity, and other factors.

Figure 10:
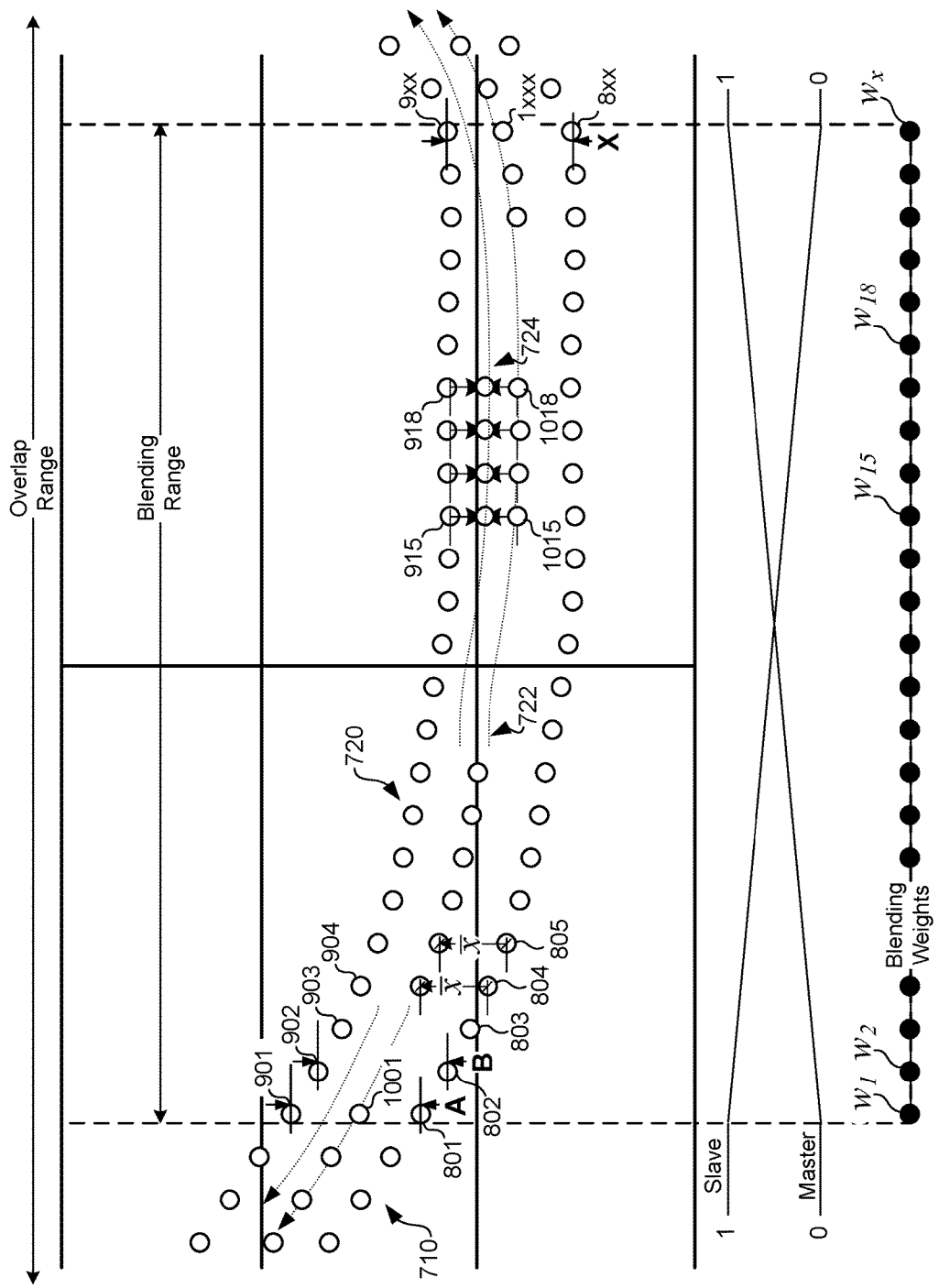
FIG. 10 illustrates example data values in a blending process performed by the monochromator of FIG. 1 according to aspects of the embodiments described herein.

At reference numeral 636, the process includes the processing circuitry 150 subtracting one or more data values among the slave range of data values from respective data values among the master range of data values over the blending range. In that way, a number of difference values are determined over the blending range. For context, FIG. 10 illustrates data values 801-8xx of the range of first data values 710 and data values 901-9xx of the range of second data values 720. At reference numeral 636, the data value 801 is subtracted from the data value 901, to determine the difference value "A". Alternatively, an absolute difference can be determined between the data value 901 and the data value 801. The difference value "A" is representative of a difference in absorbance calculated by the monochromator 10 at a certain wavelength when the range of first data values 710 was detected as compared to that same wavelength (e.g., data value position) in the range of second data values 720.

The difference value "A" can be attributed to several factors, such as the use of the detector 130A to detect the range of first data values 710 and the use of the detector 130B to detect the range of second data values 720. The difference can also be attributed to the use of different diffraction gratings, such as the UV-VIS and NIR-IR gratings 112 and 114, respectively, to generate the dispersed wavelengths of light for the detection of the ranges of first and second data values 710 and 720.

At reference numeral 636, difference values can be determined between one pair, two or more pairs, or each or all pairs of the data values in the slave range and the master range of data values over the blending range. In that sense, FIG. 10 also illustrates the difference value "B" between the data value 902 and the data value 802, and similar difference values can be determined between respective pairs (i.e., of the same wavelength) of the data values 903-9xx and 803-8xx. After calculating them, the processing circuitry 150 can store all the difference values "A"-"X" in memory for further calculations.

At reference numeral 638, the process includes the processing circuitry 150 averaging the difference values "A"-"X" over the blending range. In one case, the average difference value $\bar{x}$ can be determined as an arithmetic mean of the difference values "A"-"X" over the blending range. In other cases, the median, mode, or other measures of central tendency of the difference values "A"-"X" can be calculated as the average difference value $\bar{x}$.

At reference numeral 640, the process includes the processing circuitry 150 adding the average difference value $\bar{x}$ to individual data values in the slave range of data values. In that context, FIG. 10 shows the average difference value $\bar{x}$ being added to the data values 804 and 805 in the range of first data values 710. In practice, the average difference value $\bar{x}$ is added to each data value in the range of first data values 710 to generate a shifted range of data values 722 including data values 1001-1xxx. Here, it is noted that the average difference value $\bar{x}$ is added to every data value in the range of first data values 710, both within and beyond the blending range, effectively shifting the range of first data values 710 in absorbance based on an average difference in absorbance between data values in the first and second data values 710 and 720 over the blending range.

At reference numeral 642, the process includes the processing circuitry 150 weighting and summing individual data values among the shifted range of data values 722 with corresponding data values among the range of second data values 720 based on respective positions in wavelength of the individual data values over the blending range. Based on the weighting and summing process, a combined range of data values 724 is determined.

To perform the weighting, a set of blending weights $w_1$-$w_x$ can be developed to blend the shifted range of data values 722 with the range of second data values 720 over the blending range as shown in FIG. 10. In the example shown in FIG. 10, the shifted range of data values 722 corresponds to the slave range of data values and the range of second data values 720 corresponds to the master range of data values. Based on the application of the set of blending weights $w_1$-$w_x$ over the blending range, three different groups of data values can be identified in the combined range of data values.

As shown at the bottom of FIG. 10, each data value in the combined range of data values 724 that is to the left (i.e., of lower wavelength) of the blending range comprises a corresponding data value from the slave or shifted range of data values 722. Each data value in the combined range of data values 724 that is within the blending range comprises a weighted blend of a corresponding pair (e.g., in wavelength position) of data values from the slave or shifted range of data values 722 and the master range of second data values 720. Further, each data value in the combined range of data values 724 that is to the right (i.e., of higher wavelength) of the blending range comprises a corresponding data value from the master range of second data values 720.

The number of individual weights w in the set of blending weights $w_1$-$w_x$ can be equal to the number of data values in the blending range. As one example, over the blending range, the blending weight $w_1$ can be used to weight the corresponding data value 1001 in the shifted range of data values 722 by about 100% or 1 and to weight the corresponding data value 901 in the range of second data values 720 by the inverse of the blending weight $w_1$ (i.e., about 0). Then, the weighted data value 1001 can be added to the weighted data value 901 to create a first data value in the combined range of data values 724 within the blending range. At the other end of the blending range, the blending weight $w_x$ can be used to weight the corresponding data value 1xxx in the shifted range of data values 722 by 0% or 0 and to weight the corresponding data value 9xx in the range of second data values 720 by the inverse of the blending weight $w_x$ (i.e., about 100% or 1). Then, the weighted data value 1xxx can be added to the weighted data value 9xx to create a last data value in the combined range of data values 724 within the blending range.

The individual weights w in the set of blending weights $w_1$-$w_x$ can transition linearly from a weight of 1 at $w_1$ to a weight of 0 at $w_x$, although other shapes of transitions are within the scope of the embodiments. Thus, each data value in the combined range of data values 724 that is within the blending range comprises a weighted blend of a corresponding pair (e.g., in wavelength position) of data values from the slave or shifted range of data values 722 and the master range of second data values 720.

Through the process shown in FIG. 8, two different, overlapping ranges of data values can be combined, assimilated, and/or blended together. The process is flexible in many aspects and a number of variations on the examples described herein are within the scope of the embodiments. For example, different master and slave data ranges can be selected, the size or width of the blending range can be varied, the transition shape (e.g., linear, step, curved, etc.) of the blending weights $w_1$-$w_x$ can be varied, and other blending factors can be modified.

Figure 11:
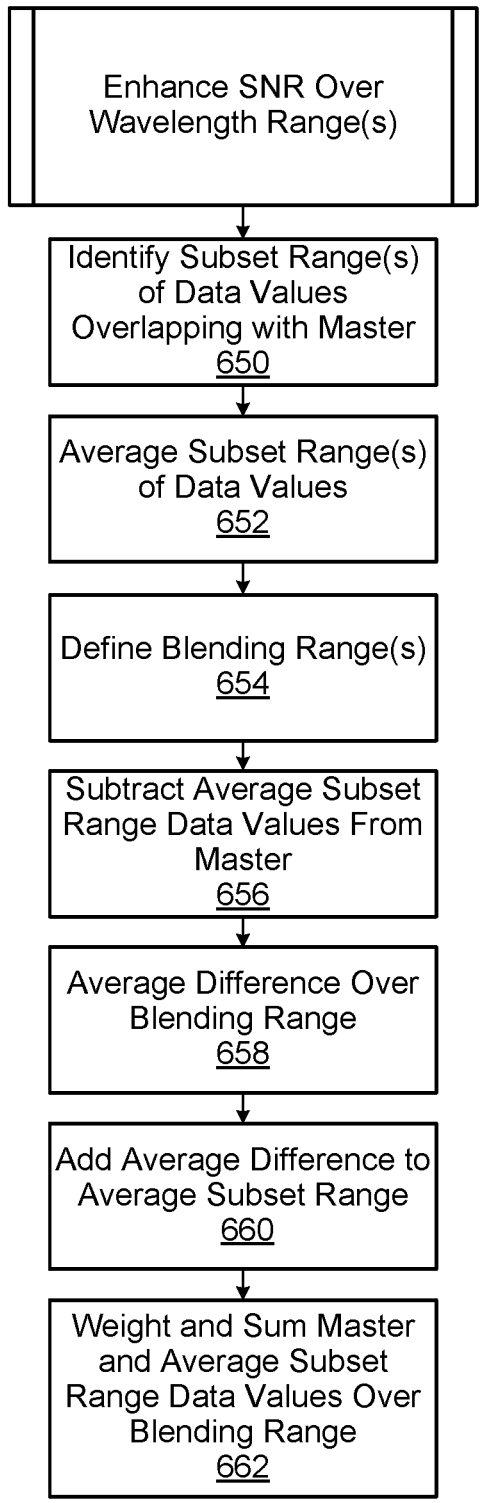
FIG. 11 illustrates an example flowchart of a process of signal to noise ratio enhancement performed by the monochromator of FIG. 1 according to aspects of the embodiments described herein.

Turning to other aspects of the embodiments, FIG. 11 illustrates an example flowchart of a process of signal to noise ratio enhancement performed by the monochromator of FIG. 1 according to aspects of the embodiments described herein. The process steps shown in FIG. 11 are representative of a number or series of steps performed at reference numeral 624 in FIG. 6. The enhancement process is designed to improve the signal to noise ration at the edges of the ranges of diffracted light provided from diffraction gratings or at the edges of the ranges of light detection by detectors, for example.

Figure 12:
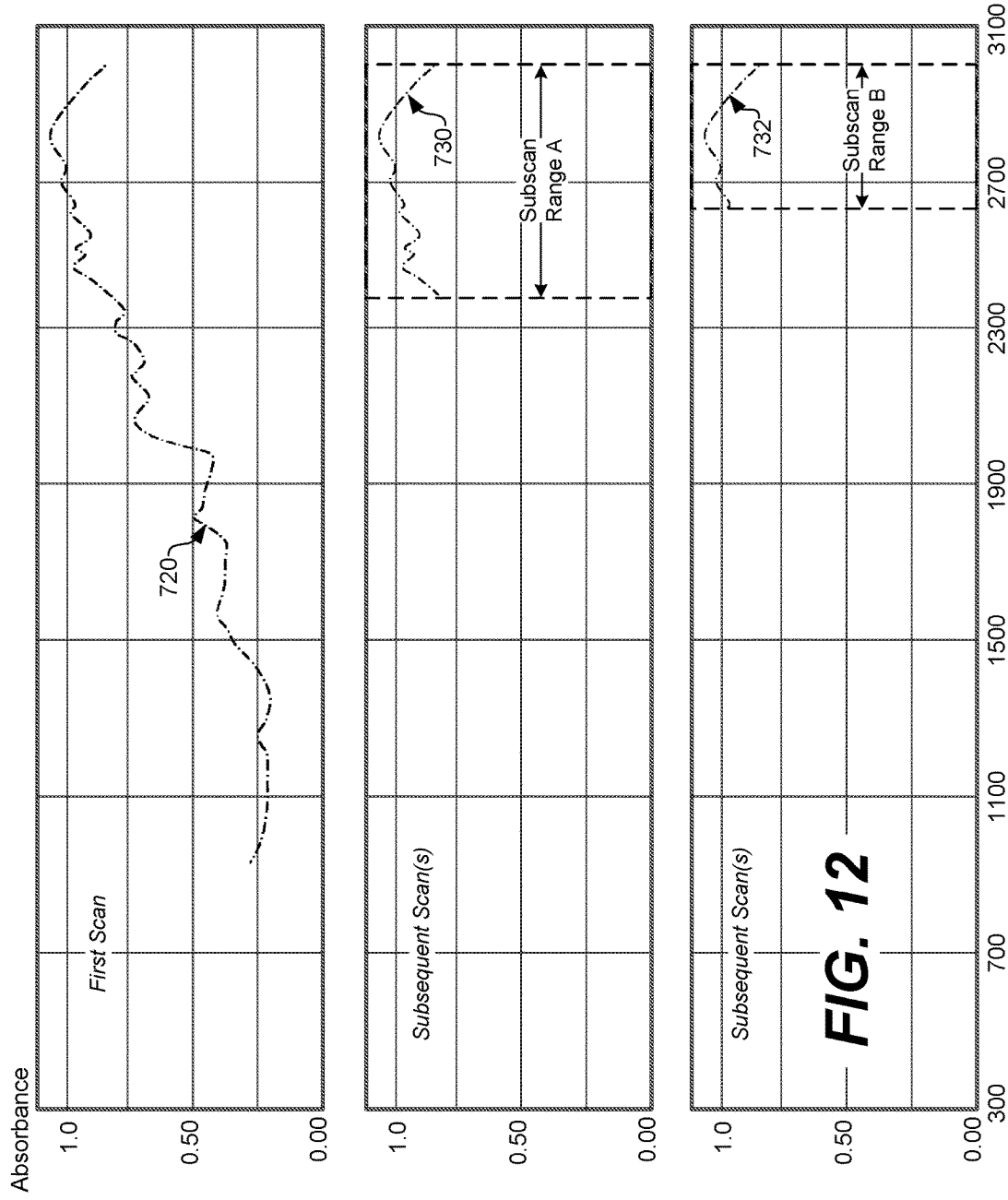
FIG. 12 illustrates example master and subscan data ranges for the process of signal to noise ratio enhancement performed by the monochromator of FIG. 1 according to aspects of the embodiments described herein.

At reference numeral 650, the process includes the processing circuitry 150 identifying subset ranges of data values that overlap in an overlapping range of wavelength with a master range of data values. As shown in FIG. 12, for example, the subset range of data values 730 overlaps with the master range of second data values 720 in an overlapping range of wavelength from about 2350 nm to about 3050 nm. Further, the subset range of data values 732 overlaps with the master range of second data values 720 in an overlapping range of wavelength from about 2650 nm to about 3050 nm.

As described above, the monochromator 10 can gather the master range of second data values 720 and the subset ranges of data values 730 and 732 through the detection of reflections of dispersed wavelengths of light over a number of measurement passes. Data can be gathered over the same ranges of wavelength using the same or different detectors and/or gratings any number of times. In each pass, data values can be measured using faster or slower grating sweeps or scans over the same or different wavelength ranges, capturing data at increased or decreased sampling rates.

Thus, although not shown in FIG. 12, the master range of second data values 720 can be representative of a single sweep of data values collected over a larger range of wavelengths in the NIR-IR range. As one example, the master range of second data values 720 can include a single value of absorbance at each interval (e.g., nanometer, etc.) of wavelength over the range of collected values.

The subset range of data values 730 can be representative of one, two, four, or more sweeps of data values collected over a relatively shorter range of wavelengths in the NIR-IR range. The sweeps can be conducted at the same rate or slower rate as compared to the master range of second data values 720, and one, two, four, or more data values can be collected at each interval of wavelength over the range of collected values.

The subset range of data values 732 can be representative of even more data values collected over an even shorter range of wavelengths in the NIR-IR range as compared to subset range of data values 730, although it is not necessary that more data is collected in every case. The sweeps can be conducted at the same or slower rate as compared to the subset range of data values 730, and the same number or more data values can be collected at each interval of wavelength over the range of collected values as compared to subset range of data values 730, although it is not necessary that more data is collected. Generally, to increase the signal to noise ratio, which can be lower toward the edges of measurement ranges in instruments, more data values can be collected by the monochromator 10 over a range of wavelengths as the range approaches a measurement range edge.

Figure 13:
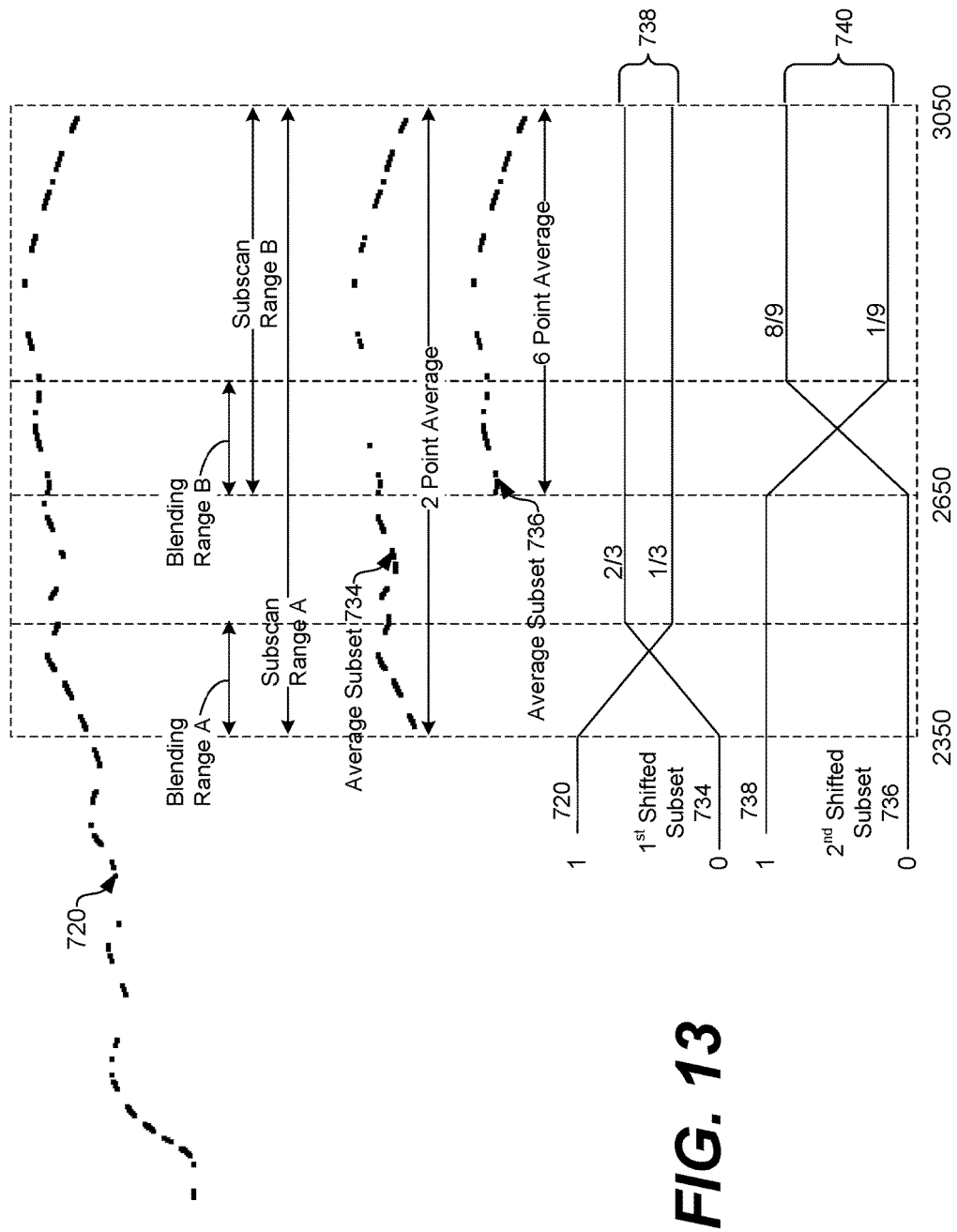
FIG. 13 illustrates further illustrates an example of the process of signal to noise ratio enhancement performed by the monochromator of FIG. 1 according to aspects of the embodiments described herein.

At reference numeral 652, the process includes the processing circuitry 150 averaging each of the data values captured at the same wavelength among the subset range of data values 730 to generate a first average subset range of data values. As one example, if the subset range of data values 730 includes two data values or points per interval of wavelength in the subscan range A from about 2350 nm to about 3050 nm, the processing circuitry 150 can calculate an arithmetic mean of the two data values per interval of wavelength from about 2350 nm to about 3050 nm. From the subset range of data values 730, an example first average subset of data values 734 is shown in FIG. 13.

The processing circuitry 150 can also calculate an arithmetic mean of six data values or points per interval of wavelength in the subscan range B from about 2650 nm to about 3050 nm to generate a second average subset range of data values. Particularly, the processing circuitry 150 can calculate an arithmetic mean of the two data values in the subset range of data values 730 from about 2650 nm to about 3050 nm along with an additional four data values in the subset range of data values 732 per interval of wavelength from about 2650 nm to about 3050 nm. Thus, as shown in FIG. 13, the second average subset of data values 736 comprises an data values averaged from two data values or points in the subset range of data values 730 and from an additional four data values or points (for a total of six) in the subset range of data values 732 per interval of wavelength from about 2650 nm to about 3050 nm.

At reference numeral 654, the process includes the processing circuitry 150 defining a first blending range in the overlapping range of wavelength between the range of first data values 710 and the subset range of data values 730 and defining a second blending range in the overlapping range of wavelength between the range of first data values 710 and the subset range of data values 732. An example first blending range A between the range of first data values 710 and the subset range of data values 730, and an example second blending range B between the range of first data values 710 and the subset range of data values 732 are shown in FIG. 13.

At reference numeral 656, the process includes the processing circuitry 150 subtracting one or more data values among the first average subset of data values 734 from respective data values among the master range of second data values 720 over the blending range A. In that way, a first number of difference values can be determined over the blending range A. Here, the first number of difference values can be determined in a manner similar to that described above at reference numeral 636 in FIG. 8.

At reference numeral 658, the process includes the processing circuitry 150 averaging the first number of difference values over the blending range A to generate a first average difference over the blending range A. In one case, the first average difference can be determined as an arithmetic mean of the first number of difference values over the blending range A. In other cases, the median, mode, or other measures of central tendency of the first number of difference values can be calculated as the first average difference over the blending range A.

At reference numeral 660, the process includes the processing circuitry 150 adding the first average difference to individual data values in the first average subset of data values 734 to generate a first shifted subset of data values. Here, adding can be performed in a manner similar to that described above at reference numeral 640 in FIG. 8, effectively shifting the range of first average subset of data values 734 in absorbance based on the first average difference to generate the first shifted subset of data values.

At reference numeral 662, the process includes the processing circuitry 150 weighting and summing individual data values among the first shifted subset of data values ($1^{st}$ shifted subset 734 in FIG. 13) with corresponding data values among the master range of second data values 720 based on respective positions in wavelength of the individual data values over the blending range A. Here, the weighting and summing can be performed in a manner similar to that described above at reference numeral 642 in FIG. 8. Based on the weighting and summing process, a first combined range of data values 738 is determined.

To perform the weighting, a set of blending weights can be developed to blend the data values in the $1^{st}$ shifted subset 734 with the master range of second data values 720 over the blending range A as shown in FIG. 13. As compared to the set of blending weights used in the blending example described above with reference to FIG. 10, however, the master range of second data values 720 is not weighted to zero over any range. Instead, because the master range of second data values 720 includes relevant data even after the blending range A, the data values in the master range of second data values 720 are weighted at 100% or 1 before the blending range A, from 100% to 33% or ⅓ within the blending range A, and at 33% or ⅓ after the blending range A. At the same time, the data values in the 1$^{st}$ shifted subset 734 are weighted at 0 before the blending range A, from 0 to 66% or ⅔ within the blending range A, and at 66% or ⅔ after the blending range A. This blend is consistent with the example described here in which the 1$^{st}$ shifted subset 734 is a two point (e.g., two sample) per data value average and the master range of second data values 720 includes one point data values.

In an iterative fashion, the same processes at reference numerals 656, 658, 660, and 662 can be performed using the second average subset of data values 734 and the first combined range of data values 738. Particularly, at reference numeral 656, the process can include the processing circuitry 150 subtracting one or more data values among the second average subset of data values 736 from respective data values among the first combined range of data values 738 over the blending range B. In that way, a second number of difference values can be determined over the blending range B.

At reference numeral 658, the process includes the processing circuitry 150 averaging the second number of difference values over the blending range B to generate a second average difference over the blending range B. At reference numeral 660, the process includes the processing circuitry 150 adding the second average difference to individual data values in the second average subset of data values 736 to generate a second shifted subset of data values.

At reference numeral 662, the process includes the processing circuitry 150 weighting and summing individual data values among the second shifted subset of data values (2$^{nd}$ shifted subset 736 in FIG. 13) with corresponding data values among first combined range of data values 738 based on respective positions in wavelength of the individual data values over the blending range B. Based on the weighting and summing process, a second combined range of data values 740 is determined.

Here, the data values in the first combined range of data values 738 are weighted at 100% or 1 before the blending range B, from 100% to about 11% or ⅑ within the blending range B, and at about 11% or ⅑ after the blending range B. At the same time, the data values in the 2$^{nd}$ shifted subset 736 are weighted at 0 before the blending range B, from 0 to about 89% or ⅑ within the blending range B, and at about 89% or ⅑ after the blending range B. This blend is consistent with the example described here in which the 2$^{nd}$ shifted subset 736 is a six point (e.g., six sample) per data value average and the combined range of data values 738 is a three point per data value average.

Through the process shown in FIG. 11, a number of different, overlapping ranges of data values can be combined together to increase the signal to noise ratio over the subscan range A and further over the subscan range B. The process is flexible in many aspects and a number of variations on the examples described herein are within the scope of the embodiments. For example, additional or fewer subscans can be used, the size or width of the blending ranges can be varied, the transition shape (e.g., linear, step, curved, etc.) of the blending weights can be varied, and other factors can be modified.

Figure 14:
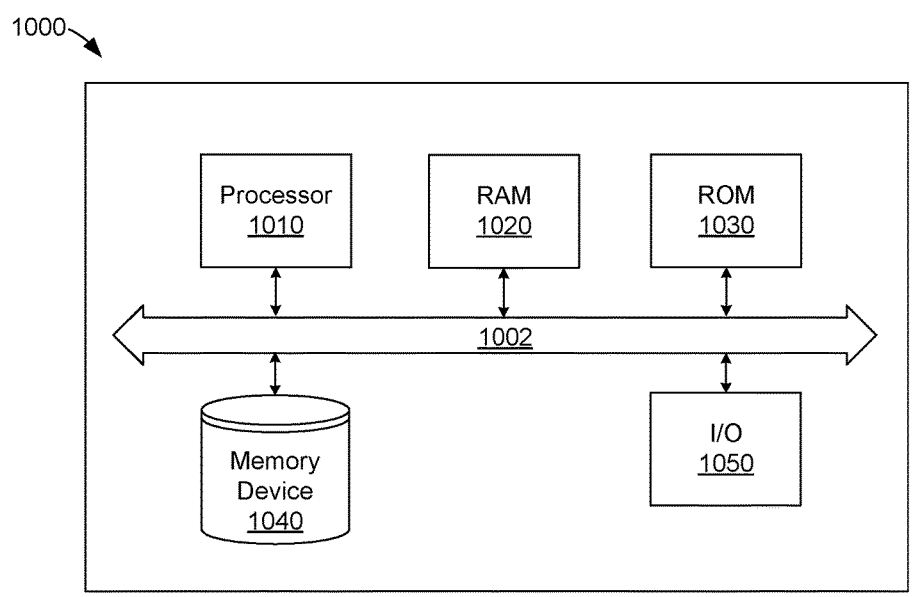
FIG. 14 illustrates an example schematic block diagram of a processing circuitry environment which can be employed in the monochromator of FIG. 1 according to an embodiment described herein.

FIG. 14 illustrates an example schematic block diagram of a processing device including processing circuitry 1000 which can be employed for the processing circuitry 150 in the monochromator 10 of FIG. 1 according to an embodiment described herein. The processing circuitry 1000 can be embodied, in part, using one or more elements of a general purpose computer. The processing circuitry 1000 includes a processor 1010, a Random Access Memory (RAM) 1020, a Read Only Memory (ROM) 1030, a memory device 1040, and an Input Output ("I/O") interface 1050. The elements of the processing circuitry 1000 are communicatively coupled via a local interface 1002. The elements of the processing circuitry 1000 described herein are not intended to be limiting in nature, and the processing circuitry 1000 can include other elements.

In various embodiments, the processor 1010 can comprise any well-known general purpose arithmetic processor, programmable logic device, state machine, or Application Specific Integrated Circuit (ASIC), for example. The processor 1010 can include one or more circuits, one or more microprocessors, ASICs, dedicated hardware, or any combination thereof. In certain aspects embodiments, the processor 1010 is configured to execute one or more software modules. The processor 1010 can further include memory configured to store instructions and/or code to various functions, as further described herein. In certain embodiments, the processor 1010 can comprise a general purpose, state machine, or ASIC processor, and the processes described in FIGS. 6, 8, and 11 can be implemented or executed by the general purpose, state machine, or ASIC processor according to software execution, by firmware, or a combination of a software execution and firmware.

The RAM and ROM 1020 and 1030 can comprise any well-known random access and read only memory devices that store computer-readable instructions to be executed by the processor 1010. The memory device 1040 stores computer-readable instructions thereon that, when executed by the processor 1010, direct the processor 1010 to execute various aspects of the embodiments described herein.

As a non-limiting example group, the memory device 1040 can comprise one or more non-transitory devices or mediums including an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The I/O interface 1050 cam comprise device input and output interfaces such as keyboard, pointing device, display, communication, and/or other interfaces, such as a network interface, for example. The local interface 1002 electrically and communicatively couples the processor 1010, the RAM 1020, the ROM 1030, the memory device 1040, and the I/O interface 1050, so that data and instructions can be communicated among them.

In certain aspects, the processor 1010 is configured to retrieve computer-readable instructions and data stored on the memory device 1040, the RAM 1020, the ROM 1030, and/or other storage means, and copy the computer-readable instructions to the RAM 1020 or the ROM 1030 for execution, for example. The processor 1010 is further configured to execute the computer-readable instructions to implement various aspects and features of the embodiments described herein. For example, the processor 1010 can be adapted or configured to execute the processes described above with reference to FIGS. 6A and 6B.

The flowcharts or processes shown in FIGS. 6, 8, and 11 are representative of certain processes, functionality, and operations of embodiments discussed herein. Each block can represent one or a combination of steps or executions in a process. Alternatively or additionally, each block can represent a module, segment, or portion of code that comprises program instructions to implement the specified logical function(s). The program instructions can be embodied in the form of source code that comprises human-readable statements written in a programming language or machine code that comprises numerical instructions recognizable by a suitable execution system such as the processor 1010. The machine code can be converted from the source code, etc. Further, each block can represent, or be connected with, a circuit or a number of interconnected circuits to implement a certain logical function or process step.

Although embodiments have been described herein in detail, the descriptions are by way of example. The features of the embodiments described herein are representative and, in alternative embodiments, certain features and elements can be added or omitted. Additionally, modifications to aspects of the embodiments described herein can be made by those skilled in the art without departing from the spirit and scope of the present invention defined in the following claims, the scope of which are to be accorded the broadest interpretation so as to encompass modifications and equivalent structures.

At least the following is claimed:

1. A monochromator, comprising:
    a diffraction grating;
    a grating drive motor to rotate the diffraction grating to provide, by diffraction of light, dispersed wavelengths of light;
    a detector configured to detect a range of first data values from a first reflection of the dispersed wavelengths of light and a range of second data values from a second reflection of the dispersed wavelengths of light, wherein at least a portion of the range of first data values overlaps in an overlapping range of wavelength with at least a portion of the range of second data values; and
    processing circuitry configured to:
        control the grating drive motor to regulate an angular velocity of the diffraction grating over a first range of motion for the first reflection of the dispersed wavelengths of light and over a second range of motion for the second reflection of the dispersed wavelengths of light;
        define a blending range in the overlapping range of wavelength;
        subtract at least one data value among the range of first data values in the blending range from at least one data value among the range of second data values in the blending range to determine at least one difference value;
        add the difference value to individual data values in the range of first data values; and
        weight and sum individual data values among the range of first data values with corresponding data values among the range of second data values based on respective positions in wavelength of the individual data values among the range of first data values over the blending range.

2. The monochromator of claim 1, wherein the processing circuitry is further configured to subtract each data value among the range of first data values from a respective data value among the range of second data values over the blending range to determine difference values over the blending range.

3. The monochromator of claim 2, wherein the processing circuitry is further configured to:
    average the difference values to generate an average difference over the blending range;
    add the average difference to each data value in the range of first data values.

4. The monochromator of claim 1, wherein the processing circuitry is further configured to, starting from one end of the blending range to another, weight and sum each data value among the range of first data values with a corresponding-data value among the range of second data values based on respective positions in wavelength of each first data value over the blending range.

5. The monochromator of claim 1, wherein:
    the detector comprises a first detector and a second detector;
    the first detector is configured to detect the first range of data values; and
    the second detector is configured to detect the second range of data values.

6. The monochromator of claim 5, wherein the processing circuitry is further configured to:
    control a sample tray drive motor to position a sample tray to cast the first reflection of the dispersed wavelengths of light onto the first detector to detect the first range of data values; and
    control the sample tray drive motor to reposition the sample tray to cast the second reflection of the dispersed wavelengths of light onto the second detector to detect the second range of data values.

7. The monochromator of claim 1, wherein:
    the detector is further configured to detect a range of third data values from a third reflection of the dispersed wavelengths of light, wherein at least a portion of the range of second data values overlap in a second overlapping range of wavelength with at least a portion of the range of third data values;
    define a second blending range in the second overlapping range of wavelength; and
    the processing circuitry is further configured to weight and sum individual data values among the range of third data values with corresponding data values among the range of second data values over the second blending range.

8. The monochromator of claim 1, wherein the diffraction grating comprises a first periodic surface region and a second periodic surface region.

9. The monochromator of claim 1, wherein the diffraction grating comprises a tandem diffraction grating, the tandem diffraction grating comprising a first diffraction grating, a second diffraction grating, and a mounting assembly having a rotatable shaft to rotate the tandem diffraction grating.

10. The monochromator of claim 9, wherein:
    the first diffraction grating comprises a first periodic surface for a first range of ultra-violet (UV) to visible (VIS) wavelengths; and
    the second diffraction grating comprises a second periodic surface for a second range of near-infrared (NIR) to infrared (IR) wavelengths.

11. A method, comprising:
    controlling, with a processing circuit in an instrument, a grating drive motor to regulate an angular velocity of a diffraction grating over a first range of motion for a first reflection of dispersed wavelengths of light and over a second range of motion for a second reflection of the dispersed wavelengths of light;
    detecting, with a detector in the instrument, a range of first data values from the first reflection of the dispersed wavelengths of light and a range of second data values from the second reflection of the dispersed wavelengths of light, wherein at least a portion of the range of first data values overlaps in an overlapping range of wavelength with at least a portion of the range of second data values;

subtracting, with a processing circuit, at least one data value among the range of first data values from at least one data value among the range of second data values to determine at least one difference value;

adding, with the processing circuit, the difference value to individual data values in the range of first data values; and weighting and summing, with the processing circuit, individual data values among the range of first data values with corresponding data values among the range of second data values based on respective positions in wavelength of the individual data values among the range of first data values.

12. The method of claim 11, wherein the detector comprises a first detector and a second detector, and the method further comprises:

detecting the first range of data values with the first detector; and detecting the second range of data values with the second detector.

13. The method of claim 12, further comprising controlling a sample tray drive motor to position a sample tray to cast the first reflection of the dispersed wavelengths of light onto the first detector to detect the first range of data values; and controlling the sample tray drive motor to reposition the sample tray to cast the second reflection of the dispersed wavelengths of light onto the second detector to detect the second range of data values.

14. The method of claim 11, wherein:

the dispersed wavelengths of light are dispersed from a tandem diffraction grating including a first diffraction grating and a second diffraction grating;

the first reflection of the dispersed wavelengths of light are dispersed from the first diffraction grating; and the second reflection of the dispersed wavelengths of light are dispersed from the second diffraction grating.

15. The method of claim 14, wherein:

the first diffraction grating comprises a first periodic surface for a first range of ultra-violet (UV) to visible (VIS) wavelengths; and the second diffraction grating comprises a second periodic surface for a second range of near-infrared (NIR) to infrared (IR) wavelengths.

16. A device, comprising:

monochromator instrumentation comprising a diffraction grating, a grating drive motor to rotate the diffraction grating to provide dispersed light, and a detector configured to detect data values from the dispersed light; and processing circuitry configured to:

control the grating drive motor to regulate an angular velocity of the diffraction grating over a first range of motion for a first reflection of dispersed light and over additional ranges of motion for a plurality of additional reflections of the dispersed light;

direct the monochromator instrumentation to detect a range of data values from the first reflection of the dispersed light;

direct the monochromator instrumentation to detect a plurality of subset ranges of data values from the plurality of additional reflections of the dispersed light, wherein at least a portion of the range of data values overlaps in an overlapping range of wavelength with the plurality of subset ranges of data values;

generate an average subset range of data values based on the plurality of subset ranges of data values;

weight and sum each data value among the range of data values with a corresponding data value among the average subset range of data values based on respective positions in wavelength of each data value over a blending range.

17. The device of claim 16, wherein the processing circuitry is further configured to define the blending range as a portion of the overlapping range of wavelength.

18. The device of claim 17, wherein the processing circuitry is further configured to, for each data value among the range of data values over the blending range, subtract a corresponding data value among the average subset range of data values to determine difference values over the blending range.

19. The device of claim 18, wherein the processing circuitry is further configured to:

average the difference values to generate an average difference over the blending range; and add the average difference to each data value in the average subset range of data values to generate a shifted average subset range of data values.

20. The device of claim 19, wherein the processing circuitry is further configured to weight and sum each data value among the range of data values with a corresponding data value among the shifted average subset range of data values based on respective positions in wavelength of each data value over the blending range.

* * * * *